(12) United States Patent
Kandori et al.

(10) Patent No.: US 7,149,017 B2
(45) Date of Patent: Dec. 12, 2006

(54) OPTICAL DEFLECTOR

(75) Inventors: Atsushi Kandori, Ebina (JP); Masao Majima, Isehara (JP); Kazunari Fujii, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/000,042

(22) Filed: Dec. 1, 2004

(65) Prior Publication Data

US 2005/0128546 A1 Jun. 16, 2005

(30) Foreign Application Priority Data

Dec. 15, 2003 (JP) ............................. 2003-416177

(51) Int. Cl.
*G02B 26/10* (2006.01)

(52) U.S. Cl. .................... 359/202; 359/214

(58) Field of Classification Search ................ 359/196, 359/198, 213, 220–221, 223, 226, 233–261

See application file for complete search history.

(56) References Cited

U.S. PATENT DOCUMENTS

| 5,483,059 A | 1/1996 | Igaki et al. |
| 5,552,919 A | 9/1996 | Majima et al. |
| 5,594,577 A | 1/1997 | Majima et al. |
| 5,654,814 A | 8/1997 | Ouchi et al. |
| 5,774,243 A | 6/1998 | Majima |
| 5,886,802 A | 3/1999 | Majima |
| 6,101,014 A | 8/2000 | Majima |
| 6,104,516 A | 8/2000 | Majima |
| 6,188,499 B1 | 2/2001 | Majima |
| 6,211,987 B1* | 4/2001 | Park ........................... 359/196 |
| 6,236,040 B1* | 5/2001 | Takemura et al. .......... 250/235 |
| 6,414,778 B1* | 7/2002 | Hori ........................... 359/204 |
| 2003/0197777 A1* | 10/2003 | Miura ......................... 347/235 |
| 2003/0227538 A1* | 12/2003 | Fujii et al. .................. 347/260 |
| 2004/0240017 A1 | 12/2004 | Kandori et al. |

FOREIGN PATENT DOCUMENTS

| JP | 07-175005 | 7/1995 |
| JP | 2001-305471 | 10/2001 |

* cited by examiner

*Primary Examiner*—Mark A. Robinson
(74) *Attorney, Agent, or Firm*—Fitzpatrick, Cella, Harper & Scinto

(57) ABSTRACT

There is provided an optical deflector which has a control means for controlling deflection portion so as to deflect a deflection light beam at a desirable maximal deflection angle. According to the optical deflector, a scanning amplitude of the deflection portion can be suitably controlled by the control means.

10 Claims, 15 Drawing Sheets

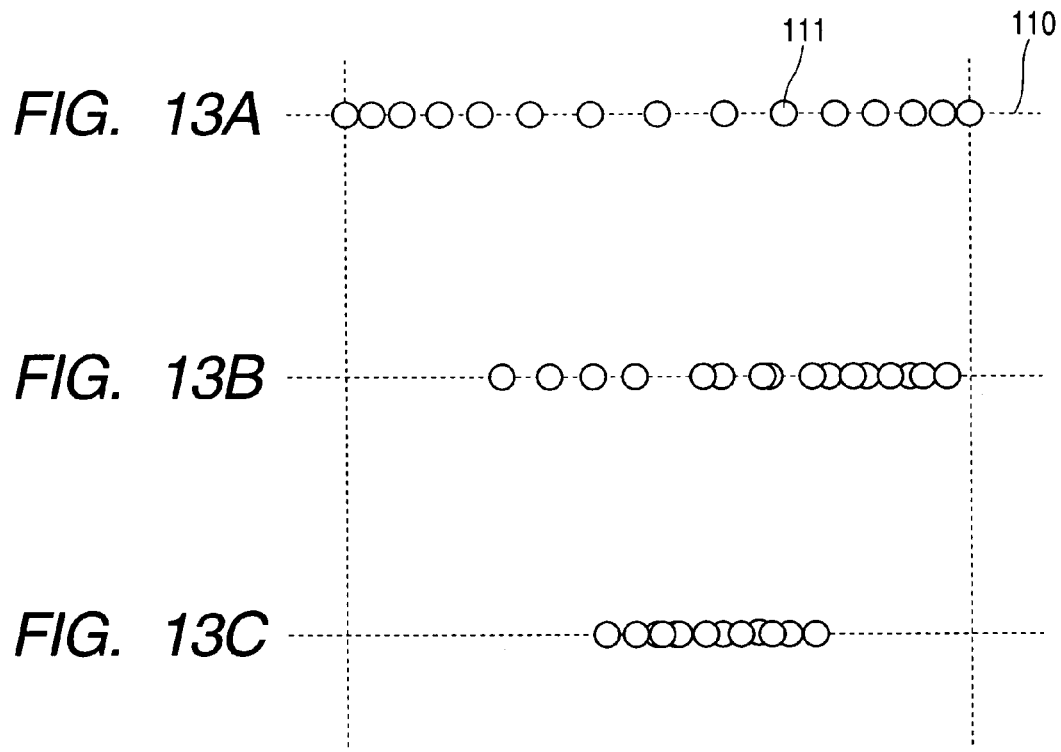
FIG. 13A
FIG. 13B
FIG. 13C
FIG. 14
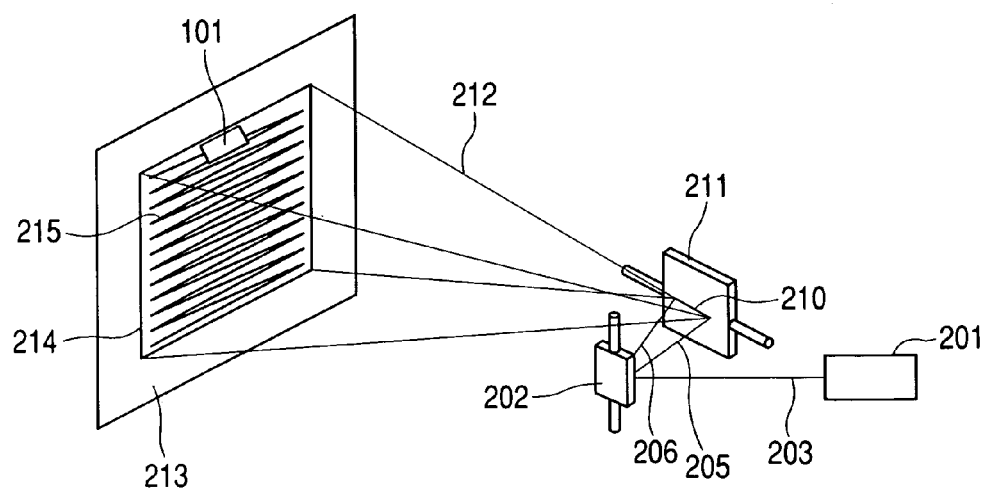

OPTICAL DEFLECTOR

BACKGROUND OF THE INVENTION

1. Field of the Invention

The present invention relates to an optical deflector having a deflection means for deflecting light.

2. Related Background Art

FIG. 1 shows a galvano-mirror which is an example of an optical deflector. This galvano-mirror can be moved by an electromagnetic force. The mirror is located on a movable portion. The movable portion is supported by a main body portion through a torsion bar so as to oscillate about a shaft center. In FIG. 1, reference numeral 50 denotes a silicon substrate, 51 denotes an upper side glass substrate, and 52 denotes a lower side glass substrate. Reference numeral 53 denotes a movable plate, 54 denotes a torsion bar, 55 denotes a flat coil, 56 denotes a total reflection mirror, 57 denotes electrode terminals, and 60 to 63 denote permanent magnets. The optical deflector is an electromagnetic type driven by allowing a drive current to flow into the flat coil 55 to use a Lorentz force produced between the flat coil 55 and the permanent magnets (for example, see Japanese Patent Application Laid-Open No. H07-175005 (pages 3 and 4 and FIG. 1)).

Another example is described in Japanese Patent Application Laid-Open No. 2001-305471 (pages 3 and 4 and FIG. 1). This relates to an electromagnetic actuator. The examples described in Japanese Patent Application Laid-Open No. 2001-305471 and the example described in Japanese Patent Application Laid-Open No. H07-175005 are identical to each other from the viewpoint that the movable portion is moved by an electromagnetic force. The electromagnetic actuator described in Japanese Patent Application Laid-Open No. 2001-305471 also has a total reflection mirror provided in a movable portion.

According to Japanese Patent Application Laid-Open No. 2001-305471, the following problem, objects, and means are described. That is, a resonance period of the electromagnetic actuator is generally drifted with temperature or time. When a current having a preset resonance frequency is continued to supply to the flat coil, a problem in that an oscillating angle is not controlled to be constant with a change in temperature and a lapse of time occurs. While paying attention to this problem, a first object is to provide an electromagnetic actuator which can be moved for reciprocation at a resonance period thereof without a specific drive detection means, a control device for controlling the electromagnetic actuator, and a method thereof. A second object is to provide an electromagnetic actuator whose oscillating angle can be controlled without a specific detection means, a drive control device for controlling the electromagnetic actuator, and a method thereof. A third object is to provide a resonance frequency signal generating device for an electromagnetic actuator which can output a resonance frequency signal corresponding to the resonance period thereof and a resonance frequency signal generating method therefor.

In order to solve the above-mentioned problem, the coil is used for driving the movable portion and also used for detection. An induced electromotive force or an induced current which is produced in the coil is detected.

Japanese Patent Application Laid-Open No. 2001-305471 describes that the resonance period of the electromagnetic actuator is drifted with temperature or time. The coil serving as the detection means is always used for driving. Therefore, a period for applying a drive signal to the electromagnetic actuator is limited.

In Japanese Patent Application Laid-Open No. H07-175005, no attention is given to a problem in that the resonance period is drifted with temperature.

SUMMARY OF THE INVENTION

The inventors of the present invention have conceived an idea different from that in Japanese Patent Application Laid-Open No. 2001-305471. That is, a detection means is separated from a drive portion of an actuator. An object of the present invention is to suitably control a scanning amplitude of a deflection means by observing operation of the deflection means without imposing a limitation on a method of driving the deflection means which is the actuator.

The present invention provides an optical deflector, including:

deflection means for deflecting a light beam from a light source to scan the light beam deflected; and control means for controlling the deflection means to deflect the light beam at a predetermined maximal deflection angle based on a positional interval between light beams modulated at a predetermined time interval on a light receiving element.

According to the present invention, it is possible to provide an optical deflector whose maximal deflection angle can be controlled to be constant without imposing a limitation on drive of the deflector and involving any influence of change in temperature.

BRIEF DESCRIPTION OF THE DRAWINGS

FIGS. 13A, 13B, and 13C are schematic explanatory views showing positions of generated modulation spots in the optical deflector according to the sixth embodiment;

FIG. 14 is a schematic view showing an optical deflector according to a seventh embodiment of the present invention;

DESCRIPTION OF THE PREFERRED EMBODIMENTS

Figure 1:
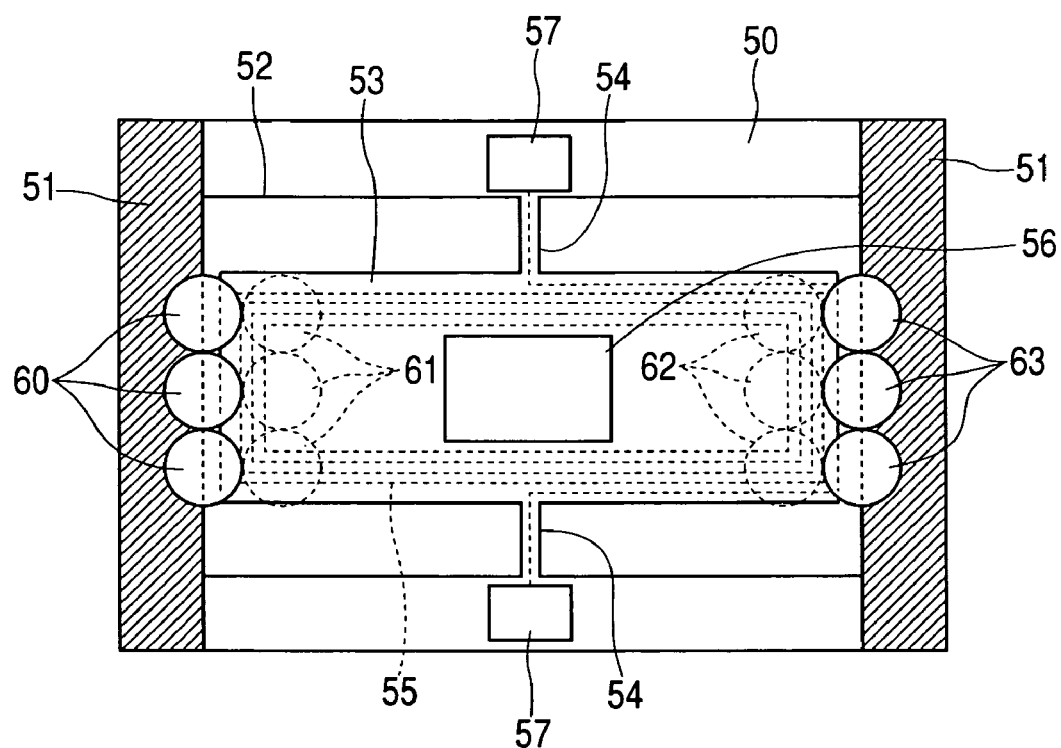
FIG. 1 shows an optical deflector.

First, reference numerals shown in the accompanying drawings will be described.

Reference numeral 50 denotes a silicon substrate, 51 denotes an upper side glass substrate, 52 denotes a lower side glass substrate, 53 denotes a movable plate, 54 denotes a torsion bar, 55 denotes a flat coil, 56 denotes a total reflection mirror, 57 denotes electrode terminals, and 60 to 63 denote permanent magnets. Reference numeral 101 denotes a light receiving element, 102 and 103 each denote a deflection light beam, 104 denotes a trajectory, 105 denotes a plurality of light receiving regions, 110 denotes an axis which coincides with a scanning trajectory, and 111 and 111' each denote a modulation spot. Reference numeral 201 denotes a light source, 202 denotes a deflection means, 203 denotes an outgoing light beam, 204 and 205 each denote a light beam at a maximal deflection angle, 206 denotes an optical deflection center axis, and 207 denotes a scanning trajectory. Reference numeral 208 denotes a deflected light beam, 209 denotes a lens, 210 denotes a scanning trajectory, 211 denotes a second deflection means, 212 denotes a deflected light beam, 213 denotes a surface, 214 and 214' each denote a scanned region, 215 denotes a scanning line trajectory, 220 denotes a photosensitive member, 221 denotes an axis including a scanning trajectory, and 222 and 223 each denote a reflection mirror. Reference numeral 301 denotes a modulation signal generating means, 302 denotes a signal conversion means, 303 denotes a control signal generating means, 304 denotes a drive means, 305 denotes a modulation signal, 306 denotes a detection signal, 307 denotes a scanning position interval signal, 308 denotes a control signal, and 309 denotes a drive signal.

(First Embodiment)

The inventors of the present invention focused attention on use in a deflection light beam which is deflected for reciprocation scanning by the deflection means moved for reciprocating motion (oscillating motion) in order to control the deflection means.

More specifically, a plurality of deflection light beams in scanning of any one of a going path and a return path are detected by a light receiving element. The deflection means is controlled by the control means such that a positional interval between the light deflection beams for a predetermined time becomes a predetermined distance.

Figure 2:
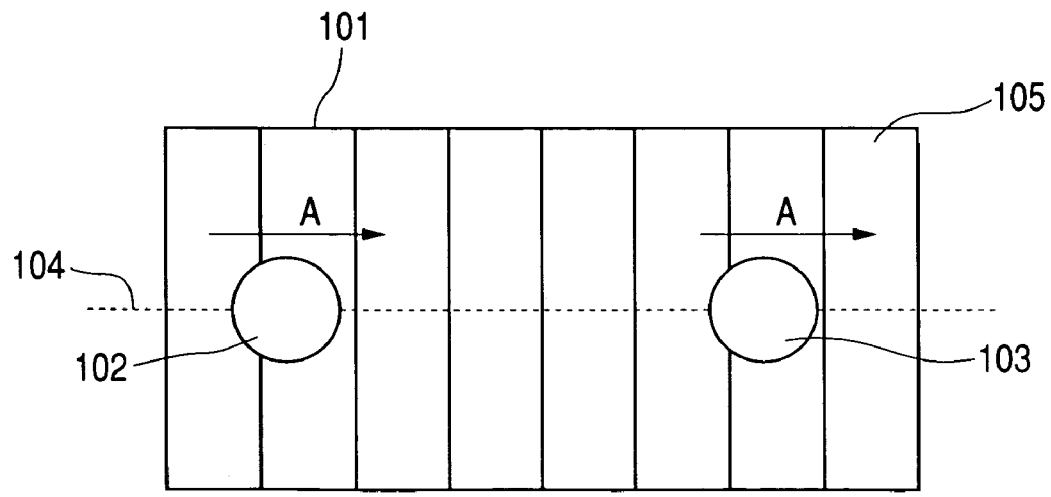
FIG. 2 is a schematic view showing a state and trajectory of only one scanning of reciprocation scanning in which a light receiving element is scanned with a deflection light beam deflected (reflected) on a deflection means of an optical deflector according to a first embodiment of the present invention.

FIG. 2 is a schematic view showing a state and trajectory of only one scanning of reciprocation scanning in which the light receiving element is scanned with a deflection light beam deflected (reflected) on the deflection means of an optical deflector according to an embodiment of the present invention.

In FIG. 2, reference numeral 101 denotes the light receiving element, 102 and 103 each denote the deflection light beam, and 104 denotes the trajectory of the deflection light beam.

Here, the deflection light beams 102 and 103 move along the trajectory 104 in a direction indicated by an arrow A. Both the deflection light beams 102 and 103 move on the light receiving element 101.

The light receiving element 101 is placed at a predetermined position, that is, a position capable of detecting (receiving) a plurality of deflection light beams on any one of the going path and the return path. When the light source is modulated (for example, turned on and off) for a predetermined time, as shown in FIG. 2, a positional interval between the plurality of deflection light beams is caused along the trajectory 104 by the deflection light beams 102 and 103 on any one of the going path and the return path (in a direction indicated by an arrow in FIG. 2), with which the light receiving element 101 is scanned. In FIG. 2, the scanning positions of the deflection light beams 102 and 103 are generated on the light receiving element 101. Three or more scanning positions may be generated.

The positional interval is changed according to a scanning speed of the deflection light beam on the light receiving element 101. When the light receiving element 101 is fixed at a position, the scanning speed on the light receiving element 101 is changed according to the maximal deflection angle of the deflection means and a period of reciprocating motion of the deflection means. Here, when the period of reciprocating motion of the deflection means is held constant, the maximal deflection angle of the deflection means can be detected from the positional interval. Therefore, when the positional interval is constant, the maximal deflection angle of the deflection means is also constant and not changed.

In this embodiment, the deflection means is controlled by the control means so as to hold the positional interval constant.

Figure 3:
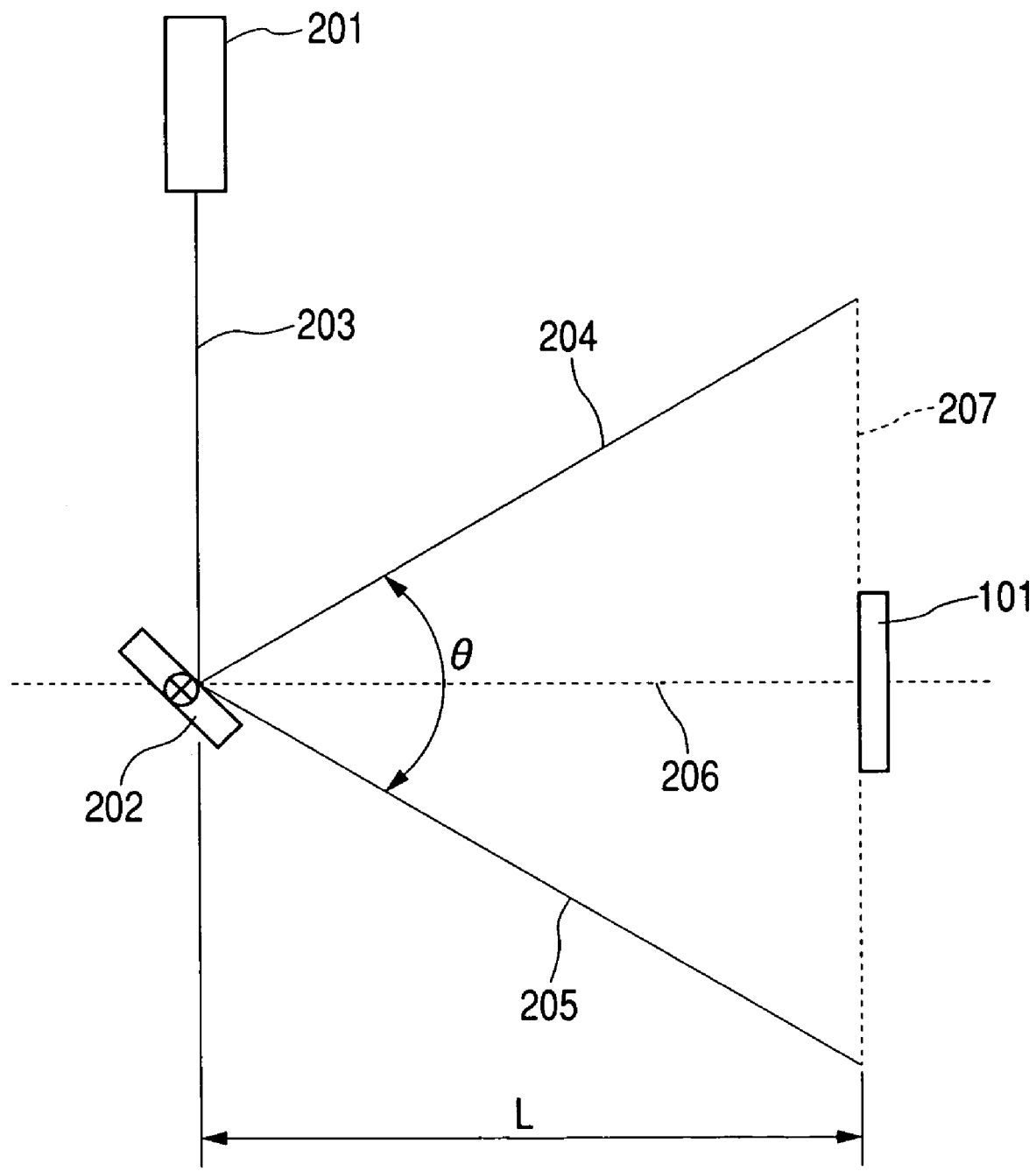
FIG. 3 is a sectional view showing a plane including deflection light beams deflected on the deflection means of the optical deflector according to the first embodiment.

FIG. 3 is a sectional view showing a plane including deflection light beams deflected on the deflection means of the optical deflector according to the embodiment of the present invention.

In FIG. 3, reference numeral 201 denotes the light source, 202 denotes the deflection means, 203 denotes the light beam emitted from the light source, 204 and 205 each denote the light beam deflected on the deflection means 202 at the maximal deflection angle, 206 denotes the optical deflection center axis of the deflection means 202, and 207 denotes the scanning trajectory on a plane located at a distance of L from the deflection means 202 (plane perpendicular to the optical deflection center axis 206).

The light beam 203 emitted from the light source 201 is incident on the deflection means 202. A light source capable of modulating light, such as a semiconductor laser is used as the light source 201.

The deflection means 202 is provided with a reflection surface. A light beam is deflected within a range including the light beams 204 and 205 traveling at the maximal deflection angle by the movement of the deflection means 202. The maximal deflection angle is given by θ.

Hereinafter, for purposes of explanation, it is assumed that a direction of a reflection light beam traveling in a state in which the deflection means 202 is not moved is aligned with the optical deflection center axis 206.

The deflection means 202 is oscillated for reciprocating motion about a rotational shaft. A drive signal having a periodic waveform is applied to the deflection means 202.

Figure 4A:
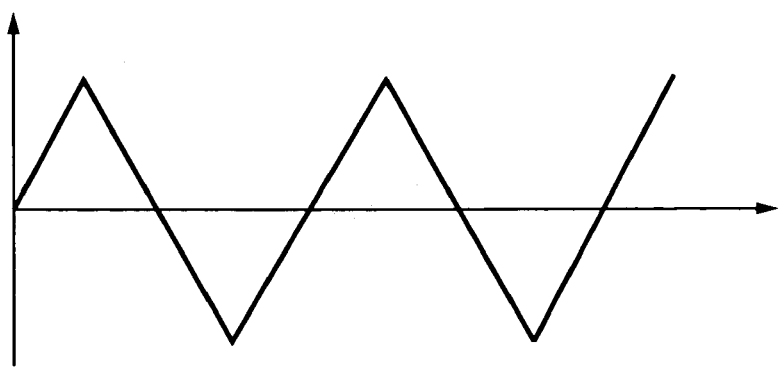
FIGS. 4A, 4B, and 4C show examples of a waveform of a drive signal applied to the deflection means of the optical deflector according to the first embodiment.
Figure 4B:
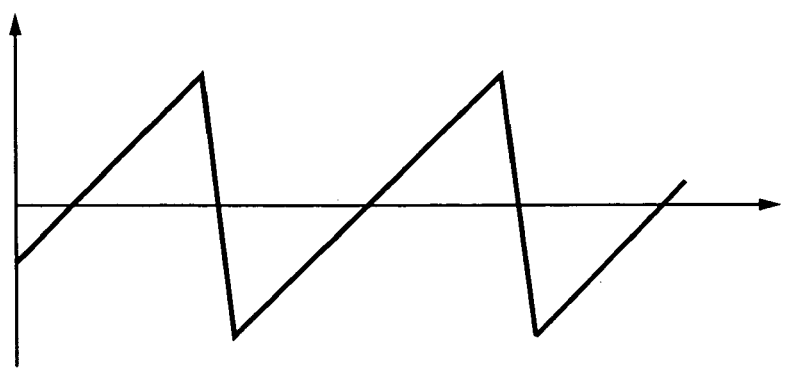
Figure 4C:
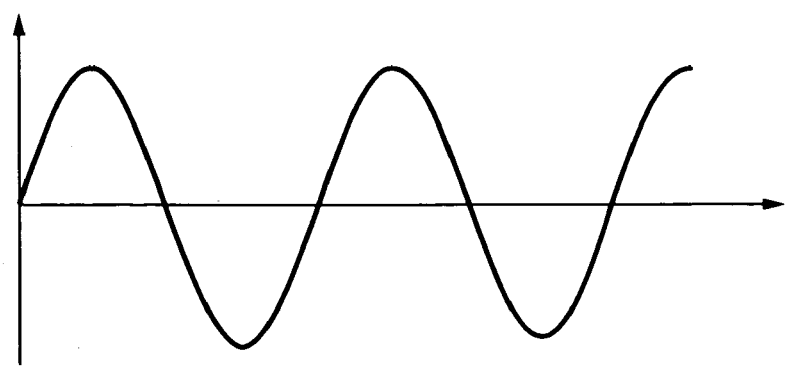

FIGS. 4A, 4B, and 4C show examples of the waveform of the drive signal applied to the deflection means 202. The abscissa indicates an application time and the ordinate indicates an amplitude of an applied drive signal. FIG. 4A shows a triangular waveform, FIG. 4B shows a saw-tooth waveform, and FIG. 4C shows a sine waveform. The deflection angle of the deflection means 202 is changed with a change in waveform of the applied drive signal.

When the drive signal having the periodic waveform as shown in FIG. 4A, 4B, or 4C is applied to the deflection means 202 to deflect a light beam, a position of scanning on the plane P located at the distance of L from the deflection means 202 (hereinafter, the movement of a deflection light beam on the plane is referred to as scanning) is shifted for reciprocation on the scanning trajectory 207. A scanning position h (distance from the optical deflection center axis 206 on the plane P located at the distance of L from the deflection means 202) can be expressed by the following expression.

$$h = L \times \tan(\theta t) \quad (1)$$

Here, θt is given as a deflection angle at which a light beam is deflected from the optical deflection center axis 206 on the deflection means at a certain time.

When the expression (1) is differentiated with respect to time, the scanning speed at the scanning position h on the plane P can be expressed. Here, θt can be calculated using a time function (θt(t)) determined by the waveform of the drive signal applied to the deflection means 202.

Therefore, when L and h each are a constant, a scanning speed v on the plane P is changed based on θt(t). When a period and shape of a waveform indicating θt(t) are identical, the scanning speed v is changed according to the maximal deflection angle θ. That is, the maximal deflection angle θ can be detected by detecting the scanning speed v.

When a time interval is negligible as compared with the period of the waveform of the applied signal (for example, when a change in scanning speed v is regarded as a linear change), it can be said that a width of scanning on the plane P at the time interval is proportional to the scanning speed v.

That is, the maximal deflection angle can be detected by detecting the scanning width at a time interval which is much shorter than the repetition period of the waveform of the applied signal.

A scanning characteristic of the deflection means 202 is varied with a change in constituent members due to a change in temperature. Therefore, even when an applied signal having a waveform with the same size is used, the maximal deflection angle θ is changed according to an environmental condition.

In this embodiment, a change in maximal deflection angle due to variations in various conditions such as environments is detected by detecting a scanning width at a time interval.

The light receiving element 101 is placed on the scanning trajectory 207 on the plane P located at the distance of L from the deflection means 202. A position of the light receiving element 101 to be placed may be within the scanning trajectory 207. Here, for illustrative purposes, the light receiving element 101 is placed substantially at the scanning center.

A method of measuring a positional interval of a modulation pattern on the light receiving element 101 based on a light intensity distribution by deflecting modulation light generated by turning on and off the light source is used to detect the scanning width at a time interval. More specifically, as shown in FIG. 2, the light source is turned on at a time interval to form a plurality of spots (high intensity areas produced by scanning light) on the light receiving element 101. When a light receiving element that outputs a signal for measuring an interval between the plurality of spots is used, it is possible to measure the positional interval of the modulation pattern.

The light receiving element 101 used in this embodiment is required to detect positions of modulated deflection light beams as positional information to obtain an interval between the positions.

In this embodiment, a line sensor including the plurality of light receiving regions 105 can be used as the light receiving element 101. It is required that such a sensor includes a light receiving element serving as a photoelectric conversion portion, an accumulation portion for accumulating a charge produced by photoelectric conversion, and a transfer portion for transferring the accumulated charge.

With such a sensor, a deflection light intensity can be detected for each of the plurality of light receiving regions. Therefore, the position of the deflection light beam on the light receiving element can be determined with high precision.

In this case, it is unnecessary to transfer the accumulated charge at high speed according to the scanning speed. Lower speed transfer can be performed after the plurality of modulation spots are formed on the light receiving element 101. Therefore, even when the scanning speed v becomes a high speed, it is possible to detect an interval between positions of the modulation spots.

When this light receiving element is used, a light intensity distribution of the modulation spot on the light receiving element 101 is accumulated as a charge and outputted as positional information for each of the plurality of light receiving regions 105. As a result, a reduction in detection precision due to a change in delay of a detection circuit, which becomes a problem in a method of detecting a scanning timing does not occur. Therefore, the position of the modulation spot can be detected with high precision.

In the method according to this embodiment, the modulated deflection light beams are detected on the light receiving element and the scanning amplitude (scanning speed) is directly measured from the scanning positions. Thus, a reduction in detection precision due to the influence of delay of the detection circuit etc does not occur, so that the scanning amplitude can be detected with high precision.

Figure 5:
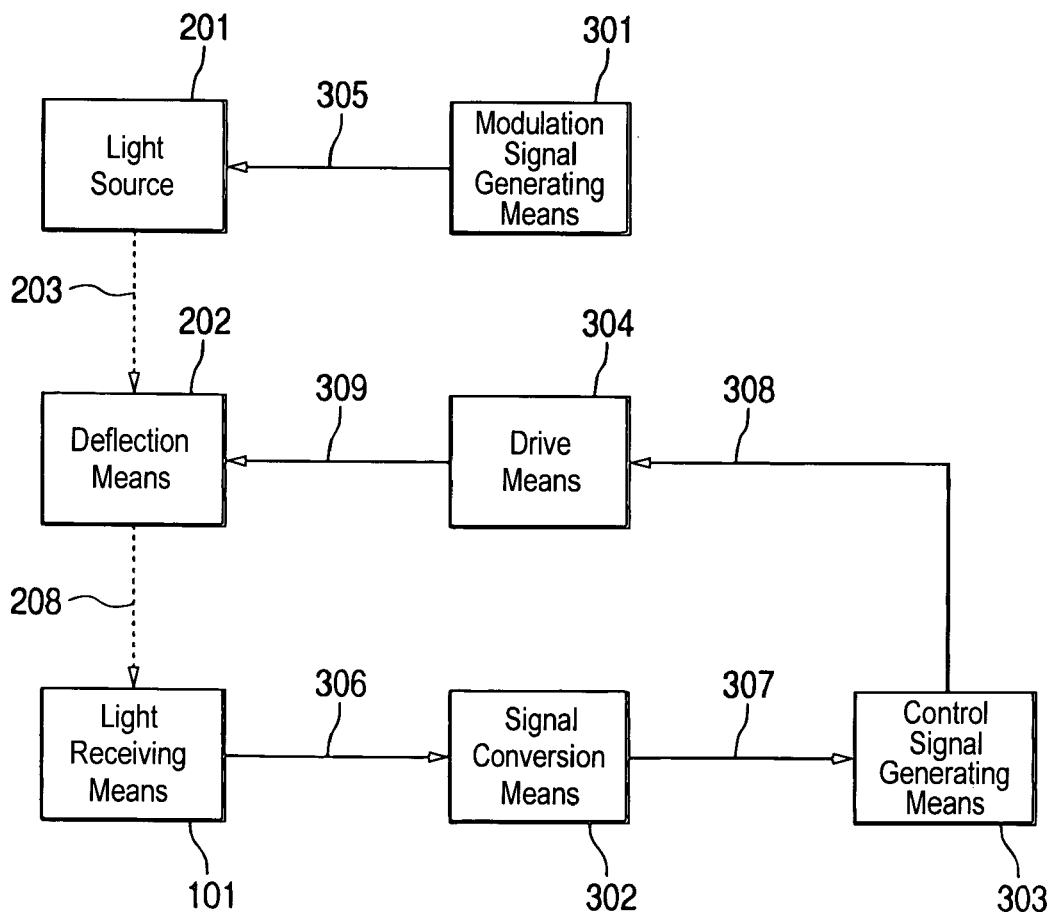
FIG. 5 is a schematic block diagram showing a control system of the optical deflector according to the first embodiment.

FIG. 5 is a schematic block diagram showing a control system of the optical deflector according to this embodiment.

In FIG. 5, reference numeral 208 denotes the deflected light beams, 301 denotes the modulation signal generating means for the light source 201, 305 denotes the modulation signal for the light source 201, 306 denotes the detection signals from the light receiving element, 302 denotes the signal conversion means, 307 denotes the scanning position interval signal, 303 denotes the control signal generating means, 308 denotes the control signal for the deflection means 202, 304 denotes the drive means for the deflection means 202, and 309 denotes the drive signal for the deflection means 202.

The light source 201 is repeatedly tuned on and off (modulated) in response to the modulation signal 305 serving as a turning-on/off signal having a predetermined period, which is outputted from the modulation signal generating means 301. Deflection light beams modulated based on the modulation signal 305 is detected by the light receiving element 101. As shown in FIG. 2, the modulation signal 305 is generated so as to detect a plurality of modulation patterns in any one of the going path scanning and the return path scanning. The plurality of modulation patterns detected by the light receiving element 101 is sent as the detection signals 306 to the signal conversion means 302.

The signal conversion means 302 calculates a scanning position interval between the modulation light beams based on the detection signals 306 from the light receiving element 101 and outputs the scanning position interval signal 307 as a signal indicating the scanning position interval between the modulation light beams to the control signal generating means 303.

The control signal generating means 303 adjusts the control signal 308 for the deflection means 202 based on the scanning position interval signal 307 such that the scanning position interval between the modulation light beams becomes a constant value. More specifically, in order to change a deflection angle of a mirror (movable plate) provided in the deflection means 202, the control signal 308 for the deflection means 202 is set so as to change an amplitude of the drive signal 309 for the deflection means 202 and the number of oscillation of the movable plate.

The drive means 304 sets the amplitude and period of the drive signal 309 based on the control signal 308 and applies the drive signal 309 for the deflection means 202 to the deflection means 202.

As described above, the optical deflector according to this embodiment can be controlled so as to hold the scanning position interval constant by detecting the modulated deflection light beams on the light receiving element.

As a result, it is possible to provide an optical deflector controlling method of driving an optical deflector having deflection means for deflecting a modulated light beam from a light source, which includes:

a measurement step of measuring an interval between a plurality of positions of the deflected light beam moved in a direction on a light receiving element; and a control step of controlling the interval to be a predetermined interval by control means, in which a scanning amplitude (deflection angle) of the deflection means is controlled by the control step.

In this embodiment, the light receiving element 101 is placed on the scanning trajectory. The deflection light beam on the scanning trajectory may be reflected using a reflection mirror or the like and then detected by the light receiving element 101. Therefore, the limitation on placement of the light receiving element 101 becomes smaller, with the result that a size of an apparatus using the optical deflector according to this embodiment can be reduced.

A plurality of reflection mirrors may be used and the deflection light beam reflected on the plurality of reflection mirrors may be allowed to enter the light receiving element 101. The scanning amplitude can be detected based on, for example, a positional relationship among the deflection means 202, the plurality of reflection mirrors, and the light receiving element 101. When a modulation spot position interval on the light receiving element 101 is detected at a preset scanning amplitude, control can be performed so as to hold the scanning amplitude constant.

Therefore, fluctuations in positions of the plurality of modulation spots with a wider deflection angle can be detected with high precision without widening a width of the light receiving element 101 in the scanning direction. Thus, the detection precision of the scanning amplitude can be improved to perform high precision control.

In this embodiment, the single light source is used as an example. The present invention can be also applied to an optical deflector having a plurality of light sources. One of the plurality of light sources can be also used.

In this embodiment, a light source capable of modulating outgoing light, such as a semiconductor laser, an LED, a solid laser having a modulation means such as an AOM, or a gas laser can be used as the light source.

In this embodiment, one-dimensional scanning in which the deflection light beam is moved on the same trajectory on the going path and the return path is described as an example. The present invention can be also applied to so-called two-dimensional scanning in which the trajectory of the return path is different from the trajectory of the going path in a direction perpendicular to the scanning direction and the trajectory of the return path is different from the trajectory of the going path at positions in a predetermined perpendicular direction.

In this embodiment, the one-dimensional scanning with the deflection light beam is described. In this case, a rotated cylindrical photosensitive member is scanned with the deflection light beam in a longitudinal direction thereof. Therefore, the present invention can be applied to a photosensitive member exposure device of a so-called electrophotographic process image forming apparatus that two-dimensionally scans the surface of a photosensitive member with the deflection light beam to obtain an electrostatic latent image.

In this embodiment, when the two-dimensional scanning with the deflection light beam is used, the present invention can be applied to an image display apparatus (projection apparatus) such as a projector.

In the image forming apparatus or the image display apparatus, the light source is turned on and off so as to correspond to a pixel composing an image. A size of a pixel is not particularly determined. The size is determined according to an image intended to form. Depending on a scanning speed, a light emitting point is shifted in one direction while the light source is turned on, so that a shape of a pixel having an actual scanning spot diameter is changed by a scanning distance. Here, a light source in which a light intensity at the center of the light emitting point is different from that at surroundings thereof (light intensity is changed as in, for example, a Gaussian distribution) is used. In this case, even when the light emitting point is shifted in the direction for a turning-on period, a substantial size of the pixel may be assumed to be only a region having a large light intensity (for example, a half value or $1/e^2$ of a maximal light intensity). For example, in the case of a projector in which an image can be directly viewed by human eyes, the size of the pixel shifted for the turning-on period may be determined based on the above-mentioned assumption used as appropriate according to human vision.

In the optical deflector according to this embodiment, the maximal deflection angle of the deflection means 202 can be held to a constant value by the control in such a manner that the interval between the positions of the plurality of deflection light beams moved on the light receiving element in a direction becomes constant. Therefore, the scanning amplitude on the projection (light beam scanning) surface can be held constant.

Thus, in the photosensitive member exposure device of the electrophotographic process image forming apparatus and the display apparatus for two-dimensionally displaying an image, an image having a desirable size can be displayed at a desirable position.

(Second Embodiment)

This embodiment relates to a method of determining a position (center position) of a modulated deflection light beam (modulation spot) on the light receiving element 101 including the plurality of light receiving regions 105. Other features are identical to those in the first embodiment.

Figure 6A:
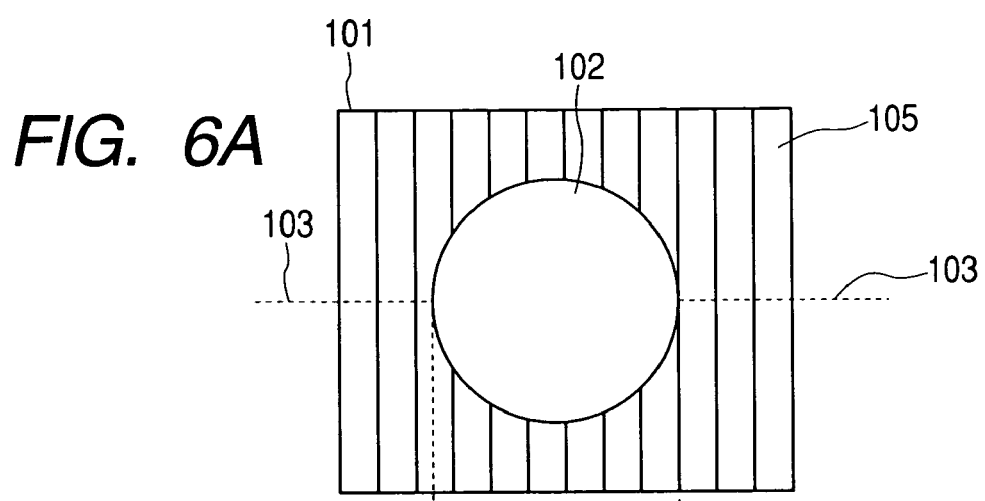
FIGS. 6A, 6B, and 6C are explanatory diagrams showing a second embodiment of the present invention.
Figure 6B:
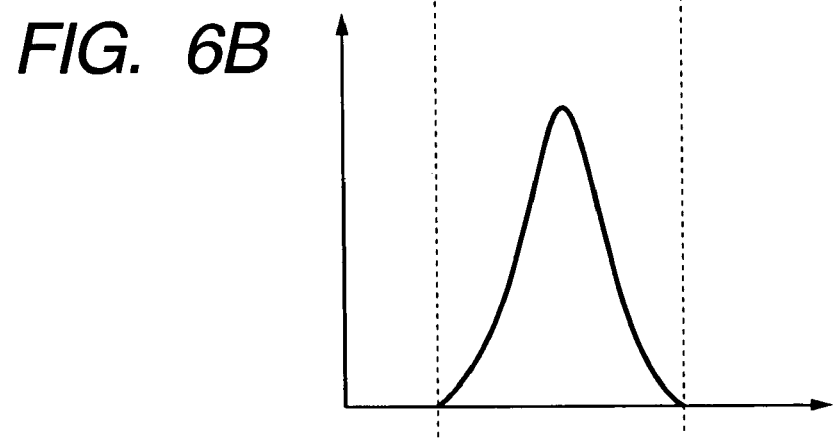
Figure 6C:
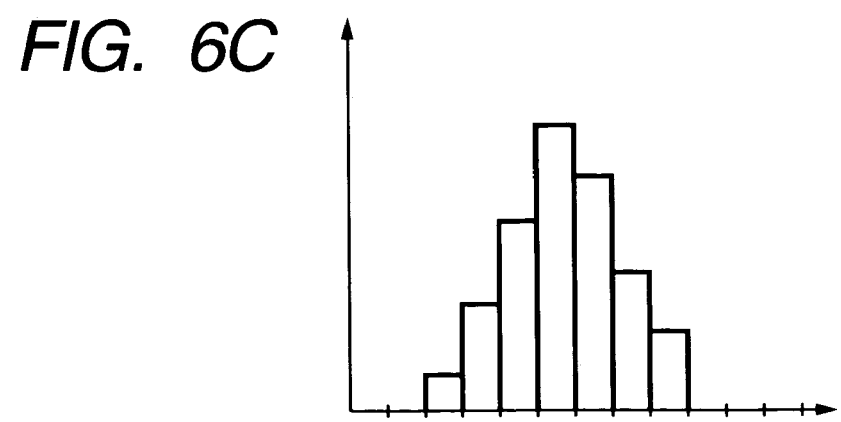

FIGS. 6A, 6B, and 6C are explanatory diagrams showing this embodiment.

FIG. 6A shows a positional relationship between a single modulation spot formed on the light receiving element 101 and the plurality of light receiving regions 105. The scanning direction is a right-and-left direction on a paper. Hereinafter, the single modulation spot formed on the light receiving element 101 will be described for the sake of simplification. When a plurality of spots is used, the present invention can be embodied by performing the same processing plural times.

FIG. 6B shows an intensity distribution of a light beam with which the light receiving element 101 is irradiated in the case of the positional relationship shown in FIG. 6A. The abscissa indicates a position on the light receiving element and the ordinate indicates a light intensity. As shown in FIG. 6B, the modulation spot has a distribution symmetric with respect to a position C where a light intensity is maximum in the right-and-left direction (for example, a so-called Gaussian distribution whose center is bright and surroundings are dark).

FIG. 6C shows a signal detected form each of the plurality of light receiving regions 105 in the case of the positional relationship shown in FIG. 6A. The abscissa indicates a position of each of the plurality of light receiving regions corresponding to a position on the light receiving element and the ordinate indicates an amplitude of the detected signal. Hereinafter, a width of each of the plurality of light receiving regions in the scanning direction in FIG. 6B is given by w. The plurality of light receiving regions are referred to as first, second, . . . , nth light receiving regions in order from the left. A light intensity detected on the nth light receiving region is given by Pn.

In this embodiment, two position determination methods will be described with reference to FIGS. 6A to 6C.

In a first position determination method, of the positions of the plurality of light receiving regions, a position of a light receiving region on which a maximal receiving light intensity is detected is regarded as a positional coordinate. For example, in the case of FIG. 6C, a position of a fifth light receiving region is regarded as the positional coordinate. Therefore, the center of the modulation spot is detected to locate at a distance of "$(5-0.5) \times w$" from the left end of the light receiving element.

The detection precision is determined from a relationship between the scanning speed v on the light receiving element 101 and the width w of each of the plurality of light receiving regions 105 of the light receiving element 101 in the scanning direction. When the scanning speed v is constant, the detection precision improves as the width w of each of the plurality of light receiving regions 105 in the scanning direction narrows.

According to the first position determination method, processing for determining a position on the light receiving element can be simplified. Therefore, a time required for processing and a load to a section for performing processing can be reduced. The width w of each of the plurality of light receiving regions 105 in the scanning direction is shortened, so that the detection precision can be improved.

In a second position determination method, a positional coordinate is determined based on a distribution of detection signals on the plurality of light receiving regions. A light intensity distribution of a modulation spot detected by the light receiving element can be regarded as the distribution symmetric with respect to the position C in which a light intensity is maximum in the right-and-left direction. When the position C in which the light intensity is maximum does not coincide with the center of the plurality of light receiving regions 105 or the boundary between the light receiving regions 105, the detection signals from the respective light receiving regions 105 have an asymmetrical distribution in the right-and-left direction (for example, the detection signals in FIG. 6C). Based on the asymmetrical distribution, a positional coordinate "$(n-1) \times w$" of each of the light receiving regions is multiplied by the corresponding light receiving intensity Pn to obtain respective multiplication values. The respective multiplication values of light receiving regions on which the spot is formed are summed to obtain a sum value "$\Sigma(n-1) \times w \times Pn$." The sum value is divided by a total light receiving intensity "$\Sigma Pn$" on the light receiving regions on which the spot is formed to determine a positional coordinate "$(\Sigma(n-1) \times w \times Pn)/(\Sigma Pn)$." Therefore, it is possible to detect the center of the spot with precision equal to or shorter than the width w of each of the plurality of light receiving regions. This method is preferable to determine the position of the deflection light beam in the case where the deflection light beam is formed across the plurality of light receiving regions 105. Even when the position C in which the light intensity is maximum coincides with the center of the plurality of light receiving regions 105 or the boundary between the light receiving regions 105, this method can be used.

According to the second position determination method, it is possible to achieve positional resolution equal to or shorter than the width w of each of the plurality of light receiving regions 105. Therefore, even when the light receiving element 101 in which the width w of each of the plurality of light receiving regions 105 is wide (shorter than a width of the detected spot) is used, the position can be determined with high precision.

(Third Embodiment)

In this embodiment, the light receiving element 101 in which the plurality of light receiving regions 105 are two-dimensionally arranged is used. Other features are identical to those in any one of the first and second embodiments.

Figure 7:
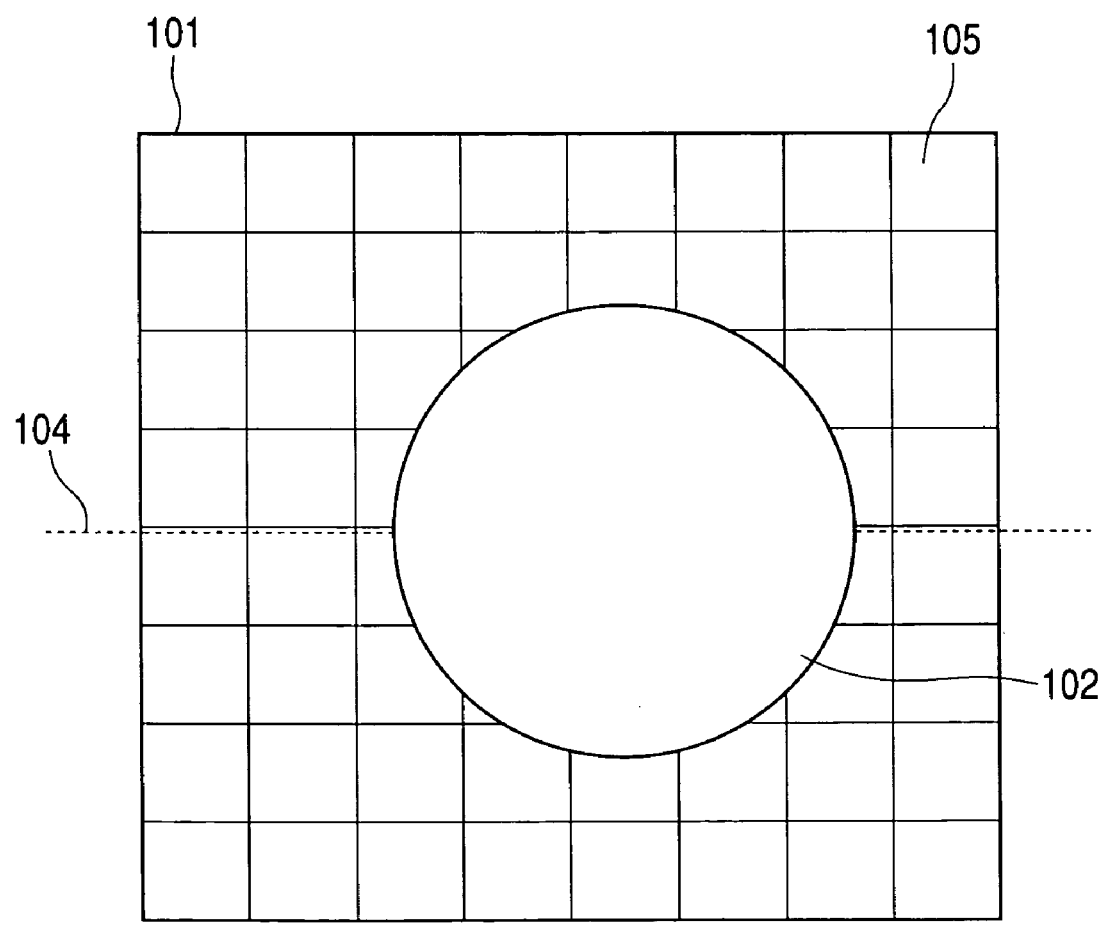
FIG. 7 is a schematic explanatory view showing a plurality of light receiving regions provided in a light receiving element according to a third embodiment of the present invention.

FIG. 7 is a schematic explanatory view showing a plurality of light receiving regions provided in a light receiving element according to this embodiment.

In FIG. 7, the light receiving element 101 includes the plurality of light receiving regions 105 two-dimensionally arranged in a uniform configuration at regular intervals.

When the plurality of light receiving regions 105 is two-dimensionally arranged as in this embodiment, it is possible to two-dimensionally detect a light intensity distribution of a modulation spot. As a result, the shape of the modulation spot can be accurately determined. When the position determination method according to the second embodiment or the like is used, the number of data of interest can be increased.

Thus, when this embodiment is used, the position of the modulation spot can be determined with higher precision.

When a plurality of deflection light beams are reflected using a plurality of reflection mirrors to form a plurality of modulation spots on the light receiving element 101, the scanning trajectory on the light receiving element 101 may be shifted in a direction perpendicular to the scanning trajectory on the light receiving element 101. Therefore, the modulation spots can be separated from each other for each scanning trajectory using the light receiving element 101 according to this embodiment. Even when the width of the light receiving element 101 in the scanning direction is shortened, the position of each of the modulation spots can be detected. Thus, it is possible to reduce a cost of the light receiving element 101 and save a space in configurations.

A general purpose CCD area sensor for image taking or a CMOS area sensor can be used as the light receiving element 101 according to this embodiment. Thus, a reduction in cost can be reduced because it is unnecessary to design a specific sensor.

In this embodiment, the light receiving element in which the plurality of light receiving regions is two-dimensionally arranged in the uniform configuration is described. In addition to such a light receiving element, it is possible to use a light receiving element in which the light receiving regions are arranged in a honeycomb shape, a light receiving element in which rows and columns are shifted for nesting in a direction of the trajectory or a direction orthogonal to the trajectory, or a light receiving element in which the light receiving regions are arranged in a polygonal shape such as a circular shape, a parallelogrammatic shape, a triangular shape, a rhombic shape, or a trapezoid shape.

(Forth Embodiment)

In this embodiment, a deflection light beam incident on the light receiving element is condensed by a lens. Other features are identical to those in any one of the first to third embodiments.

Figure 8:
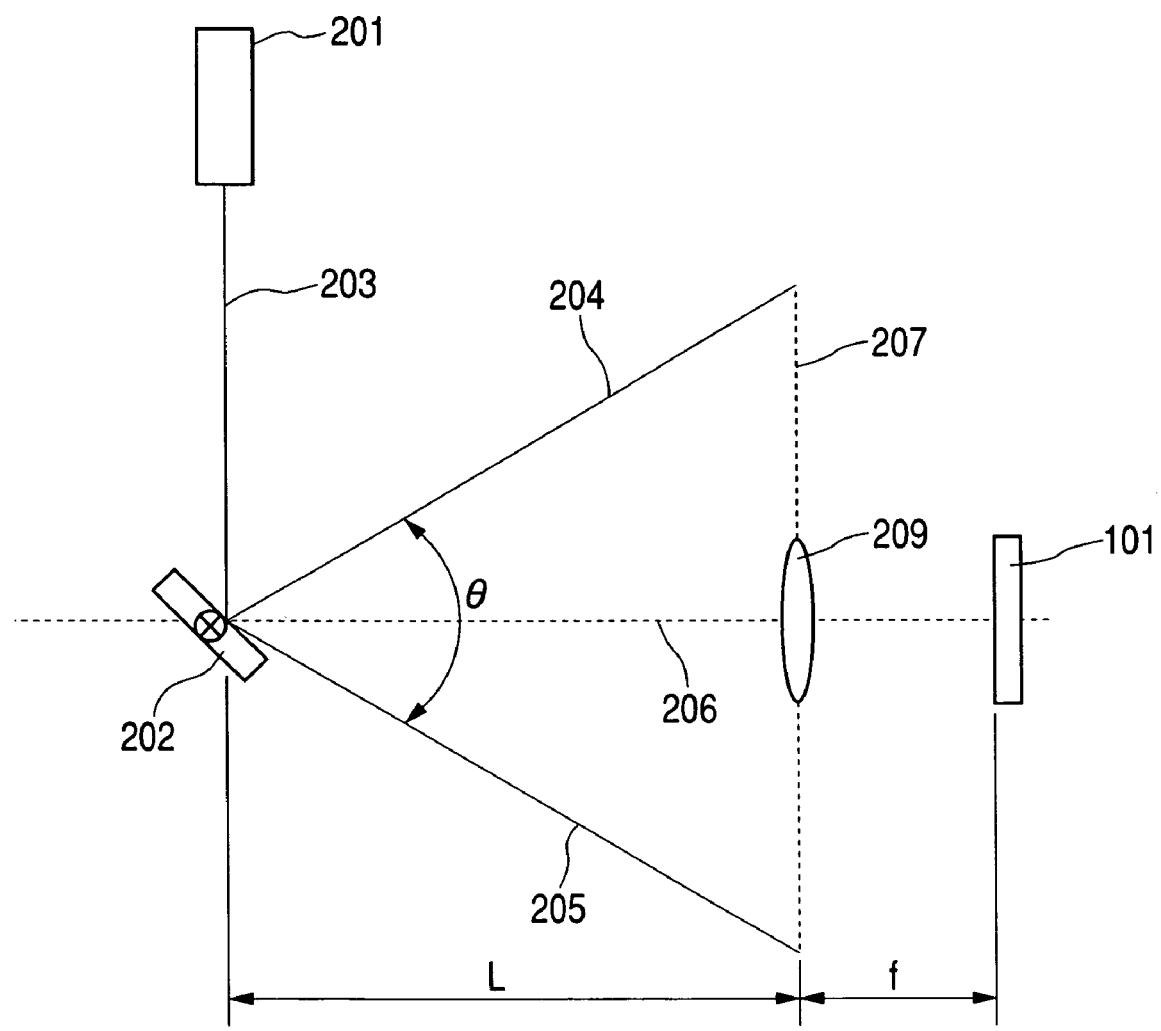
FIG. 8 is a sectional view showing a plane including deflection light beams deflected on a deflection means of an optical deflector according to a fourth embodiment of the present invention.

FIG. 8 is a sectional view showing a plane including deflection light beams deflected on a deflection means of an optical deflector according to this embodiment. In FIG. 8, reference numeral 209 denotes the lens.

The lens 209 is located at the distance of L from the deflection means 202. The light receiving element 101 is placed at a position corresponding to a focal distance f of the lens 209. A light beam deflected on the deflection means 202 is condensed by the lens 209, so that a width of a modulation spot shortens. The center position of the modulation spot is displaced from that in the first embodiment because the light beam is further deflected by the lens 209.

The scanning position h and the deflection angle θt at a time can be expressed by the following expression.

$$h = f \times \tan(\theta t) \quad (2)$$

When the focal distance f of the lens 209 is lengthened regardless of the distance of L, the scanning speed v on the light receiving element 101 can be increased from the expression (2). When it is assumed to modulate the light beam at the same time intervals, a change in positional interval between modulation spots due to a change in amplitude becomes larger, with the result that the detection precision is improved.

The position of the spot is independent of the distance of L. When L is shortened and the lens 209 whose focal distance f is long is used, a configuration of respective elements is simplified, so that a size of the optical deflector can be reduced.

The lens may be used as a constituent element of the optical deflector according to this embodiment. The lens may be integrally provided in the light receiving element.

In this embodiment, the deflection light beam is condensed on the light receiving element 101 by the lens 209. Therefore, the position of the deflection light beam on the light receiving element 101 can be determined with high precision or a size of the entire optical deflector can be reduced.

(Fifth Embodiment)

This embodiment relates to an optical deflector including the deflection means 202 with a resonance phenomenon. Other features are identical to those in the first embodiment.

A resonance-type deflector is used as the deflection means 202. When a mechanical resonance frequency fc and drive frequency fd of the resonance-type deflector are allowed to be equal to each other, a wide deflection angle can be obtained even in the case of the same drive energy. However, the mechanical resonance frequency fc of the optical deflector is significantly changed due to a change in environment of the optical deflector, such as a temperature. Therefore, the maximal deflection angle (scanning amplitude) of the deflection means 202 changes.

In order to hold the scanning amplitude constant, control for allowing the mechanical resonance frequency fc and drive frequency fd of the resonance type deflector to be equal to each other needs to be performed.

Figure 9A:
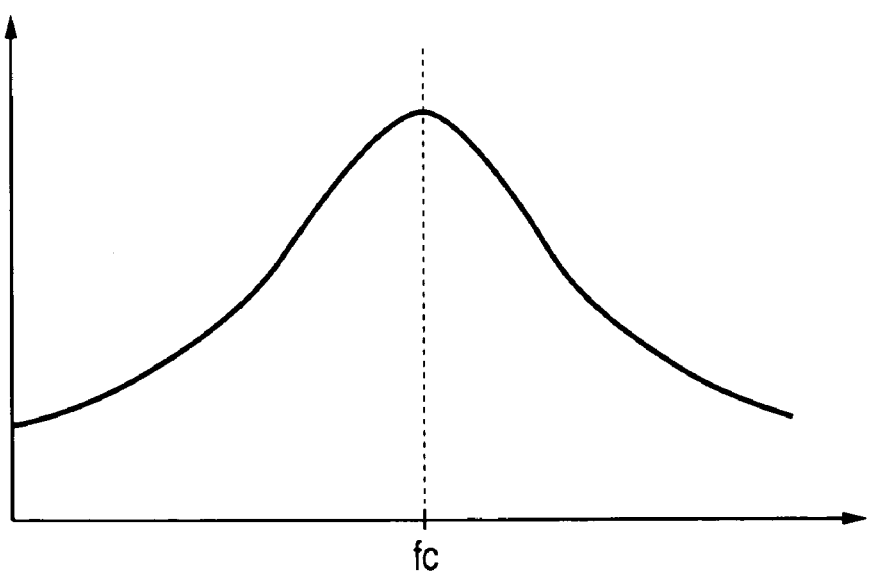
FIGS. 9A and 9B are graphs showing frequency characteristics of a resonance-type deflector of an optical deflector according to a fifth embodiment of the present invention.
Figure 9B:
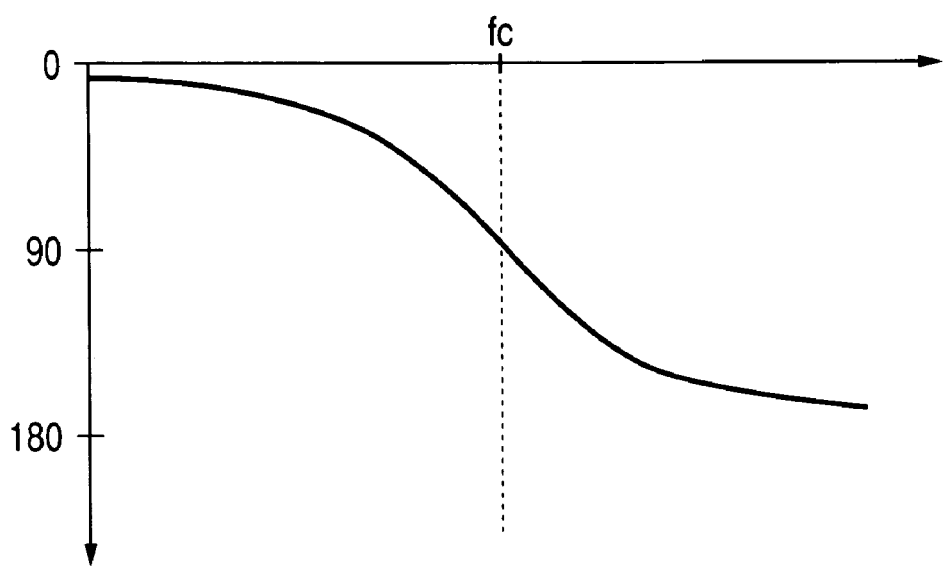

FIGS. 9A and 9B are graphs showing frequency characteristics of the resonance-type deflector.

In FIG. 9A, the abscissa indicates the drive frequency fd of a drive signal for oscillating the resonance-type deflector. The ordinate indicates an amplitude of a deflection angle (oscillating angle) (maximal deflection angle θ) of the resonance-type deflector. In FIG. 9A, a frequency at which the maximal deflection angle θ takes a maximal value is the resonance frequency fc (in the ideal case where delays caused by a driver circuit and the like are excluded).

As described above, when the drive frequency fd and the resonance frequency fc are different from each other in the resonance-type deflector, the maximal deflection angle θ reduces to shorten the scanning amplitude.

In FIG. 9B, the abscissa indicates the drive frequency fd of the drive signal for oscillating the resonance-type deflector (corresponds to the abscissa in FIG. 9A). The ordinate indicates a phase delay from a synchronous signal of the drive frequency fd. An origin (0 deg.) on the abscissa indicating the phase delay is shifted according to a timing for generating the synchronous signal of the drive frequency fd.

A relationship between FIGS. 9A and 9B is maintained in the case where the resonance frequency fc of the optical deflector is constant. Even when the resonance frequency fc is changed due to a change in environment such as a temperature, only a parameter of the drive frequency fd on the abscissa shown in FIGS. 9A and 9B is changed while the relationship between FIGS. 9A and 9B is maintained (while similar curve shape parameters such as a tilt, width, and peak height of each curve are hardly changed).

Based on such a relation, the resonance-type deflector is driven at such a drive frequency fd that the maximal deflection angle θ continuously becomes maximum (drive frequency is changed). As a result, the drive frequency fd and the resonance frequency fc can be allowed to be equal to each other.

Even in the case of the same frequency difference, the influence on the scanning amplitude (maximal deflection angle θ) becomes larger as a value indicating drive efficiency (Q value in resonance) increases. Therefore, it is necessary to change a frequency in smaller steps.

According to this embodiment, the control for allowing the drive frequency fd to follow the resonance frequency fc of the resonance-type deflector is performed. Thus, the scanning amplitude can be held constant.

Figure 10A:
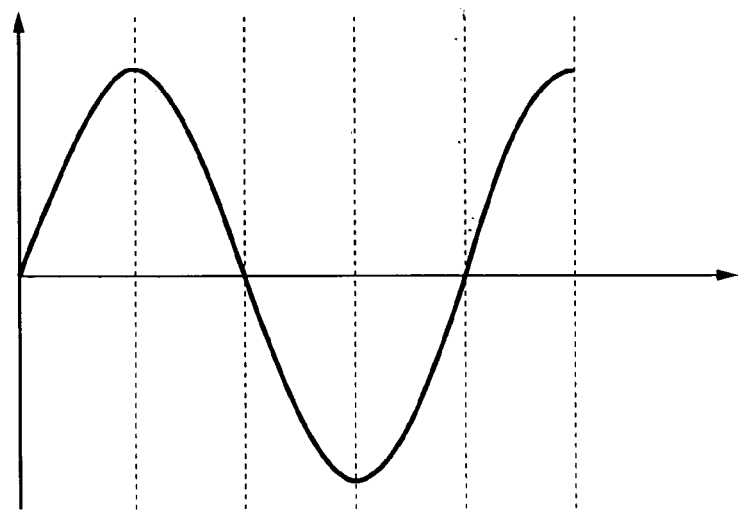
FIGS. 10A and 10B are graphs showing a drive signal for a deflection means which is the resonance-type deflector of the optical deflector according to the fifth embodiment and a time change in deflection angle at application of the drive signal.
Figure 10B:
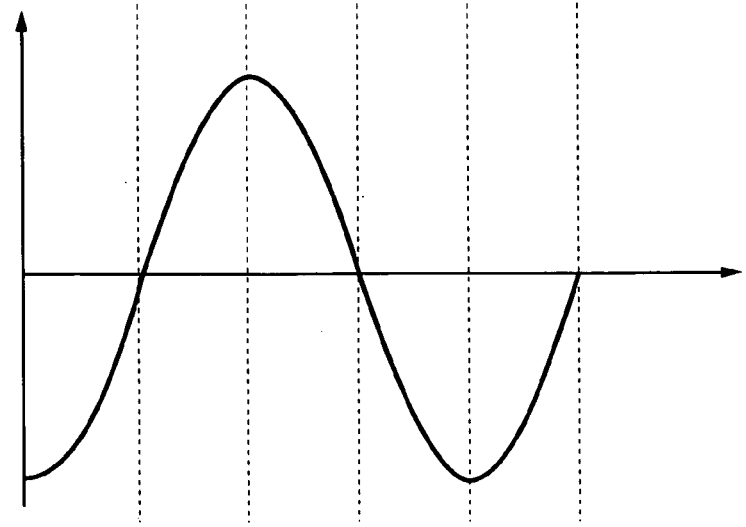

FIGS. 10A and 10B are graphs showing the drive signal 309 for the deflection means 202 which is the resonance-type deflector and a time change in deflection angle at the application of the drive signal 309.

In FIG. 10A, the abscissa indicates a time and the ordinate indicates a signal amplitude (for example, a voltage) of the drive signal 309 for the deflection means 202.

In FIG. 10B, the abscissa indicates a time axis corresponding to that on the abscissa in FIG. 10A and the ordinate indicates the deflection angle θt of the deflection means 202 at each time.

As shown in FIG. 10A, assume that a drive waveform is set to a sine wave and the drive frequency fd is equal to the resonance frequency fc. In this case, as shown in FIG. 10B, a phase delay of 90 deg. is caused with respect to a change in deflection angle θt. At this time, a phase offset of 180 deg. may be caused according to setting of a deflection orientation of the deflection means 202 (which rotational direction of the deflection means 202 with respect to a rotational axis thereof is set to a positive direction or a negative direction).

When the resonance-type deflector is used and the drive waveform is a triangular shape, a rectangular wave, or a saw-tooth wave other than the sine wave, the deflection angle θt changes in a sine waveform with time. When the deflection angle at a time t is θt(t), "θt(t)=A·sin(ωt)" is obtained. Note that "A" denotes a constant determined from a maximal scanning angle and ω denotes a constant determined from the drive frequency of the deflection means 202. A deflection angular speed of the deflection means 202 on the light receiving element 101 can be expressed by "θt(t)/dt=Aω·cos(ωt)."

Therefore, the scanning speed v (scanning width per unit time) on the light receiving element 101 periodically charges with time. In this embodiment, it is necessary to embody the present invention in view of this point.

When the light receiving element 101 is placed near the optical deflection center axis 206, the scanning speed v changes corresponding to the maximal deflection angle θ.

When the light receiving element 101 is placed at a distance of "l" from the optical deflection center axis 206, control may be performed in view of changing the maximal deflection angle θ and the scanning speed on the light receiving element 101 according to a change in drive frequency fd. In this case, a scanning position can be calculated from the distance L and the distance "l" at which the light receiving element 101 is placed.

As described above, in this embodiment, the resonance-type deflector is used as the deflection means 202 whose angular speed periodically changes with time. As a result, the control for holding the scanning amplitude (maximal deflection angle) constant can be performed. Thus, the resonance-type deflector which can obtain low power and a high deflection angle can be used for applications that require high scanning precision.

In this embodiment, the control for allowing the drive frequency fd and the resonance frequency fc to be equal to each other (scanning amplitude becomes maximum) is described. Control for holding a difference between the drive frequency fd and the resonance frequency fc to a constant value can be also performed so as to obtain an arbitrary scanning amplitude. In this case, a direction of change in the scanning amplitude becomes a single direction, so that frequency follow-up control is easily performed.

(Sixth Embodiment)

This embodiment relates to a modulation spot generating method of detecting a positional interval and a modulation spot detecting method. Other features are identical to those in any one of the first to fifth embodiments.

Figure 11A:
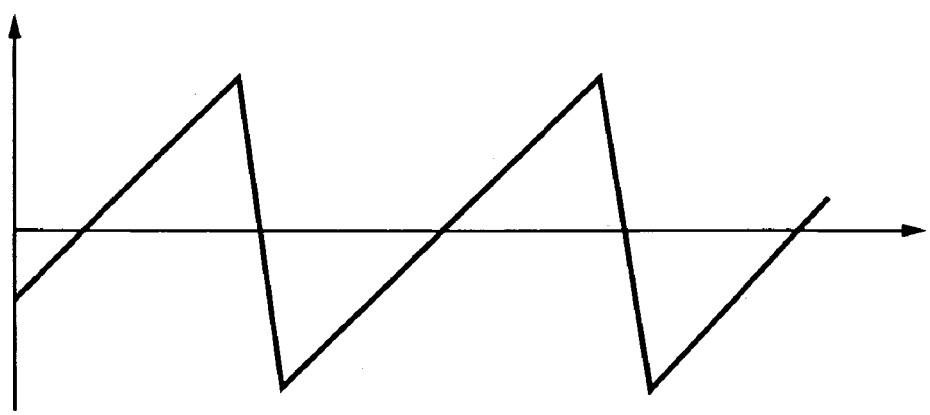
FIGS. 11A and 11B are explanatory graphs showing a modulation spot generating method for an optical deflector according to a sixth embodiment of the present invention.
Figure 11B:
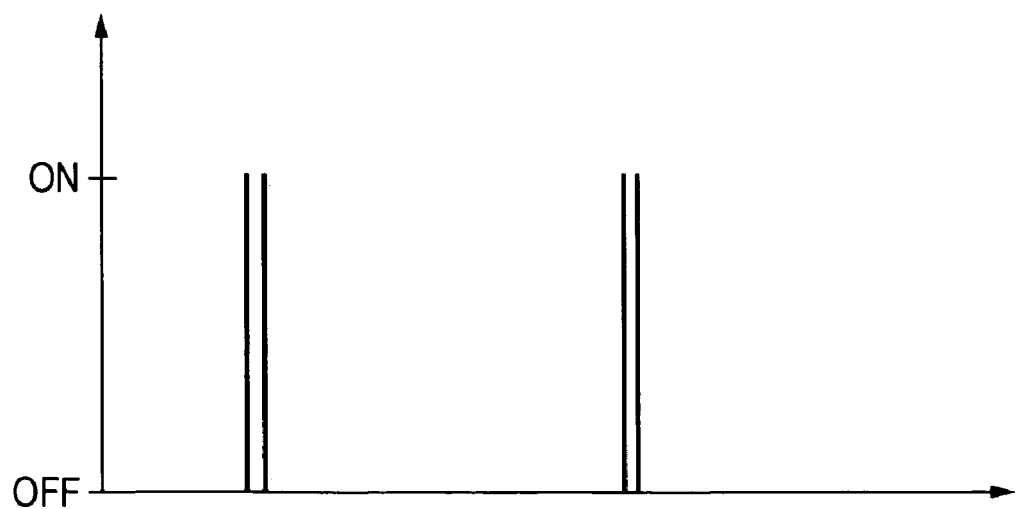

FIGS. 11A and 11B are explanatory graphs showing a modulation spot generating method according to this embodiment.

FIG. 11A shows a waveform of the drive signal 309 applied to the deflection means 202. The abscissa indicates a time and the ordinate indicates an amplitude of the applied signal. The modulation spot generating method will be described using a drive waveform of a triangular wave as an example.

FIG. 11B shows the modulation signal 305 for modulating (turning ON and OFF) the light source 201. The abscissa indicates a time corresponding to that on the abscissa shown in FIG. 11A and the ordinate indicates a pattern of the modulation signal 305. Here, the modulation signal 305 is an OFF signal at a normal state. When the modulation signal is generated by modulation on the light receiving element 101, the modulation signal 305 becomes an ON signal.

The modulation signal 305 has two separate ON signals for separately generating the modulation spots (deflection light beams) 102 and 103 on the light receiving element 101 while a surface including the light receiving element 101 is scanned in a given direction by the deflection means 202.

In the above-mentioned method, the drive signal is set to a triangular waveform. Another drive waveform can be also used.

As described above, the number of generated modulation spots is two. In this embodiment, a plurality of modulation spots larger than two can be also used. When the plurality of modulation spots are detected by the light receiving element 101, a positional interval between two of the detected modulation spots can be also used for control. An average value of a plurality of measured positional intervals can be also used. A time interval between the ON signals of the modulation signal may be within a period for which the modulation spots are generated on the light receiving element 101 in one directional scanning.

The ON signal for the modulation spot can be generated at regular time intervals during a period for one directional scanning.

Thus, the modulation spots can be easily generated on the light receiving element 101 without adjusting the position of the light receiving element 101 and a generation timing of the modulation signal.

Hereinafter, another modulation spot generating method according to this embodiment will be described. For this generating method, the resonance-type deflector which is the deflection means 202 and the light receiving element 101 including the plurality of light receiving regions are used.

Figure 12A:
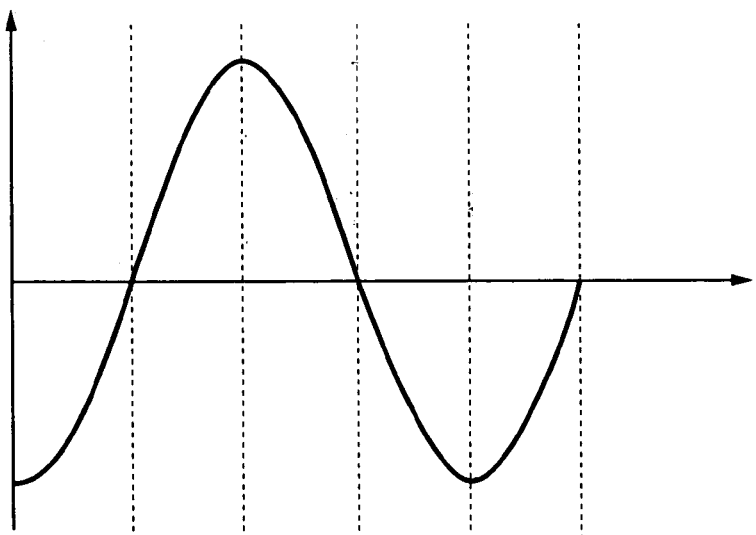
FIGS. 12A and 12B are explanatory graphs showing another modulation spot generating method for the optical deflector according to the sixth embodiment.
Figure 12B:
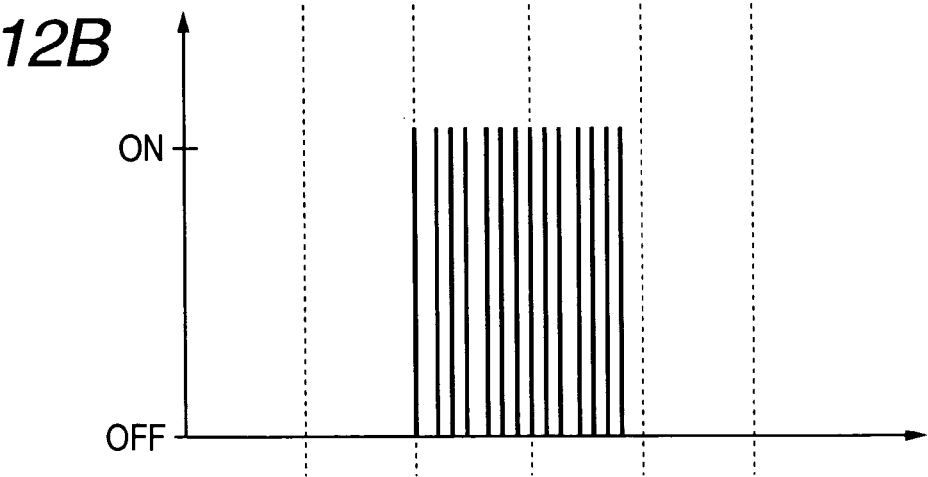

FIGS. 12A and 12B are explanatory graphs showing another modulation spot generating method according to this embodiment.

FIG. 12A shows a time change in deflection angle of the resonance-type deflector which is the deflection means 202. Assume that the resonance frequency fc and the drive frequency fd are equal to each other. The abscissa indicates a time and the ordinate indicates the deflection angle θ at a given time. The deflection angle changes in a sine waveform because the resonance-type deflector is used.

FIG. 12B shows the modulation signal 305 for modulating (turning ON and OFF) the light source 201. The abscissa indicates a time corresponding to that on the abscissa shown in FIG. 12A and the ordinate indicates a pattern of the modulation signal 305.

The modulation signal 305 is generated at regular time intervals while the surface including the light receiving element 101 is scanned in a direction by the deflection means 202. When a phase difference between a synchronous signal of a drive signal in which the resonance frequency fc and the drive frequency fd are equal to each other and the deflection angle is 90 deg., the modulation signal is generated within a period for one directional scanning.

FIGS. 13A, 13B, and 13C are schematic explanatory views showing positions of generated modulation spots. Reference numeral 110 denotes the axis which coincides with the scanning trajectory and 111 denote a generated modulation spot. The number of modulation spots in those drawings is not equal to the number of ON signals in FIG. 12B. However, actually, the number of modulation spots is equal to the number of ON signals.

Here, the light receiving element 101 is placed at the scanning center position on the axis 110 related to the scanning trajectory.

In the case shown in FIGS. 12A and 12B, a resonance-type deflection angle takes a maximal deflection angle and a phase difference is 90 deg., so that the generated modulation spots 111 are distributed as shown in FIG. 13A. In this case, the light source is turned on during only one directional scanning using the resonance-type deflector. Therefore, there is no case where the generated modulation spots 111 overlap with one another. A deflection angular speed changes with time because the resonance-type deflector is used, with the result that an interval between the modulation spots 111 is wide at the central part of a scanning area and the interval is narrow at the peripheral part thereof.

Here, a case is considered where the resonance frequency fc and the drive frequency fd are slightly displaced from each other as shown in FIG. 13B. In such a case, the deflection angle slightly reduces, so that the scanning amplitude reduces and a change in phase difference occurs. As a result, the modulation spots 111 overlap with one another at one end of the scanning area and the modulation spots 111 do not exist at the other end thereof.

The deflection means 202 is the resonance-type deflector. Therefore, when the resonance frequency fc and the drive frequency fd are displaced from each other, the phase difference is likely to change in a range of 0 deg. to 180 deg. Thus, the modulation spots 111 are unevenly distributed in the right half or left half of the scanning area.

Further, a case is considered where the resonance frequency fc and the drive frequency fd are significantly displaced from each other as shown in FIG. 13C. In such a case, the deflection angle (scanning amplitude) significantly reduces, so that an interval between the modulation spots 111 becomes narrower. As a result, the adjacent modulation spots 111 overlap with each other, so that the modulation spots 111 can be separated from one another.

According to the modulation spot generating method in this embodiment, in a state shown in FIG. 13C, the scanning amplitude is detected from a total intensity of light detected on the light receiving element 101. When the interval between the modulation spots 111 is narrow, an intensity of light detected on the light receiving element 101 becomes larger. Conversely, when the interval between the modulation spots 111 is wide, the number of modulation spots 111 incident on the light receiving element 101 reduces, so that an intensity of light detected becomes smaller. By using this fact, the positional interval between the modulation spots 111 incident on the light receiving element 101 is detected. The drive frequency fd is shifted so as to widen the positional interval, thereby controlling the scanning amplitude.

A state in which the modulation spots can be separated from one another on the light receiving element 101 is obtained by controlling the scanning amplitude. After that, the control described in any one of the first to fifth embodiments is performed. Therefore, according to the modulation spot generating method in this embodiment, the two detection algorithms are switched based on the state of the modulation spots.

According to the modulation spot generating method in this embodiment, even when the modulation spots cannot be optically separated from one another (even when the modulation spots cannot be separated from one another in the case where the time interval between the ON signals of the modulation signal 305 is maximized), it is possible to detect information related to the positional interval between the modulation spots detected by the light receiving element 101.

Even when the initial drive frequency fd is significantly displaced from the resonance frequency fc, the resonance frequency fc can be detected by a sweep with the drive frequency fd. Therefore, the scanning amplitude can be controlled to a desirable value.

In the modulation spot generating method according to this embodiment, as shown in FIG. 13B, the ON signals of the modulation signal 305 are generated during only a period for one directional scanning at the phase difference of 90 deg. Therefore, when the light receiving element 101 is placed at the scanning center, the modulation spots generated on the going path and the return path do not overlap with one another on the light receiving element 101 except for the case of the phase difference of 0 deg. or 180 deg. In actual use, there is no case where the phase difference does not become 0 deg. and 180 deg. (there is no case where the resonance frequency fc and the drive frequency fd are significantly displaced from each other). As a result, only the modulation spots related to one directional scanning are constantly generated on the light receiving element 101.

Therefore, an increase in light resulting from a reduction in interval between the modulation spots due to a change in scanning amplitude can be separated from an increase in light resulting from overlaps of the modulation spots generated on the going path and the return path due to a change in phase difference. Thus, the scanning amplitude (maximal deflection angle) can be detected on the light receiving element 101.

According to the modulation spot generating method in this embodiment, in not only the case where the resonance frequency fc is close to the drive frequency fd but also the case where the resonance frequency fc is apart from the drive frequency fd, the scanning amplitude can be detected on the light receiving element 101 which includes a plurality of photoelectric portions, a plurality of charge accumulation portions, and a plurality of accumulated charge transfer portions. Therefore, the scanning amplitude can be controlled in a wide frequency range by using only the light receiving element 101 described in any one of the first to fifth embodiments.

According to the modulation spot generating method in this embodiment, it is unnecessary to change the modulation signal 305, so that the modulation signal 305 is generated by simple processing. Thus, a processing circuit can be simplified.

The modulation signal 305 is not necessarily a fixed pattern and may be changed according to the interval between the modulation spots on the light receiving element 101. Therefore, the interval between the modulation spots can be constantly detected on the light receiving element 101 with a suitable state, with the result that high precision detection can be performed.

In the modulation spot generating method according to this embodiment, the light receiving element 101 is placed at the scanning center. The ON signals for the modulation spots are generated at regular intervals during a period for one directional scanning. When a range capable of detecting a displacement between the resonance frequency fc and the drive frequency fd is limited, it is possible to perform a design that the light receiving element 101 is shifted or a period for generating the ON signals for the modulation spots (the number of generated ON signals) is shortened (reduced) during the period for one directional scanning.

(Seventh Embodiment)

This embodiment relates to an optical deflector for two-dimensionally projecting a deflection light beam to a surface to be projected. Other features are identical to those in any one of the first to sixth embodiments.

FIG. 14 is a schematic view showing an optical deflector according to this embodiment.

In FIG. 14, reference numeral 211 denotes the second deflection means and 210 denotes the scanning trajectory of a deflection light beam deflected on the deflection means 202 on a reflection surface of the second deflection means 211. Reference numeral 212 denotes the light beam deflected on the second deflection means 211, 213 denotes a surface, 214 denotes the region on the surface 213 which is scanned with the deflection light beam, and 215 denotes the schematic scanning line trajectory on the surface 213.

The control system shown in FIG. 5 is not shown in FIG. 14.

The deflection means 202 and the second deflection means 211 each deflects a light beam in the horizontal direction and the vertical direction. Therefore, an area to which the deflection light beam is expanded becomes a two-dimensional region.

The deflection means 202 and the second deflection means 211 have different deflection speeds. More specifically, when the two deflection means are compared with each other in FIG. 14, the deflection means 202 deflects the light beam at relatively high speed (high frequency) and the second deflection means 211 deflects the light beam at relatively low speed (low frequency). A deflection speed relationship between the deflection means 202 and the second deflection means 211 may be reversed.

When the resonance-type deflector is used as the deflection means that deflects the light beam at relatively high speed, a high resolution image can be displayed. This is because the resonance-type deflector can perform high speed deflection.

The light beam 203 which is modulated by the light source 201 and emitted therefrom is deflected on the deflection means 202 between the light beams 204 and 205 at the maximal deflection angle (maximal deflection angle θ). The second deflection means 211 deflects, as the light beam 212, the scanning trajectory 210 of the light beam with which the reflection surface of the second deflection means 211 is scanned by the deflection means 202. The light beam is deflected so as to produce the scanning area 214 expanded on the surface 213 located at an arbitrary position. The schematic scanning line trajectory within the scanning area 214 on the surface 213 is shown by reference numeral 215.

The light receiving element 101 is placed at a desirable position on the scanning area 214. More specifically, the light receiving element 101 may be placed on a horizontal scanning trajectory.

Figure 15:
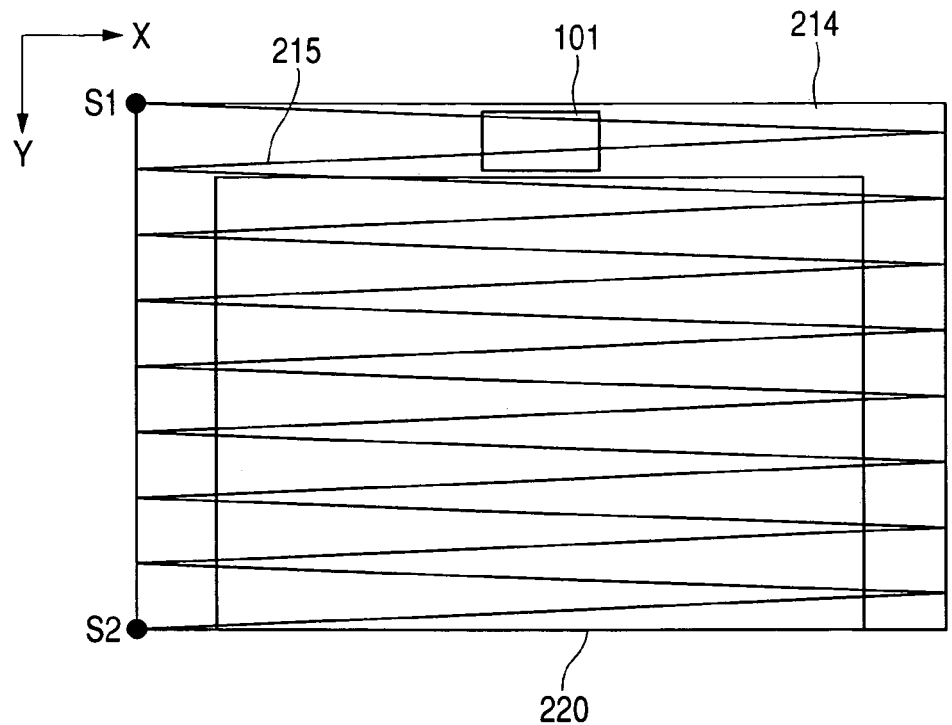
FIG. 15 is a schematic view showing the light receiving element placed in a scanning area and a display region in the optical deflector according to the seventh embodiment.

FIG. 15 is a schematic view showing the light receiving element 101 placed in the scanning area 214 and a display region in this embodiment.

In FIG. 15, reference numeral 220 denotes a display region used for image formation.

The scanning area 214 has the display region 220 and a region in which the light receiving element 101 is placed. When scanning with the deflected light beam 212 starts from a scanning point S1, the deflected light beam moves on the going and return paths in a horizontal scanning direction X. Then, the deflected light beam gradually moves from an upper part of the scanning area 214 to a lower part thereof in a vertical scanning direction Y. The deflection light beam which reaches a scanning point S2 is returned to the scanning point S1 again and the same scanning is repeated.

The light receiving element 101 is placed on the scanning line trajectory 215 such that the deflected light beam 212 passes therethrough.

Therefore, according to the optical deflector in this embodiment, in a two-dimensional image forming apparatus using the resonance-type deflector, it is possible to detect the interval between the modulation light beams by the light receiving element 101 to hold the scanning amplitude constant during image formation. Thus, a high quality image can be displayed using the resonance-type deflector.

In this embodiment, the light receiving element 101 is placed in the scanning area 214. A scanning light beam in the scanning area 214 may be reflected using a reflection mirror or the like and then detected by the light receiving element 101. A deflected light beam traveling between the deflection means 202 and the second deflection means 211 may be detected.

In this embodiment, the region in which the light receiving element 101 is provided is separated from the display region 220. When an image is not visually influenced in practical use by the presence of the light receiving element 101, the deflection mirror for light detection using the light receiving element 101, or the like, the light receiving element 101, the reflection mirror, or the like may be provided in the display region 220.

The deflected light beam 212 may be a light beam having an intensity only at a time when the deflected light beam 212 moves on the light receiving element 101 in a region other than the display region 220. That is, the deflected light beam 212 may have an intensity on at least the light receiving element 101 on the trajectory.

(Eighth Embodiment)

An optical deflector according to this embodiment further includes the light receiving element 101. Others are identical to those in any one of the first to seventh embodiments.

In this embodiment, the optical deflector is used as an image forming apparatus which has the two deflection means and displays a two-dimensional image by horizontal scanning and vertical scanning with the deflection light beam as described in the seventh embodiment. Hereinafter, only a difference with the seventh embodiment will be described.

Figure 16:
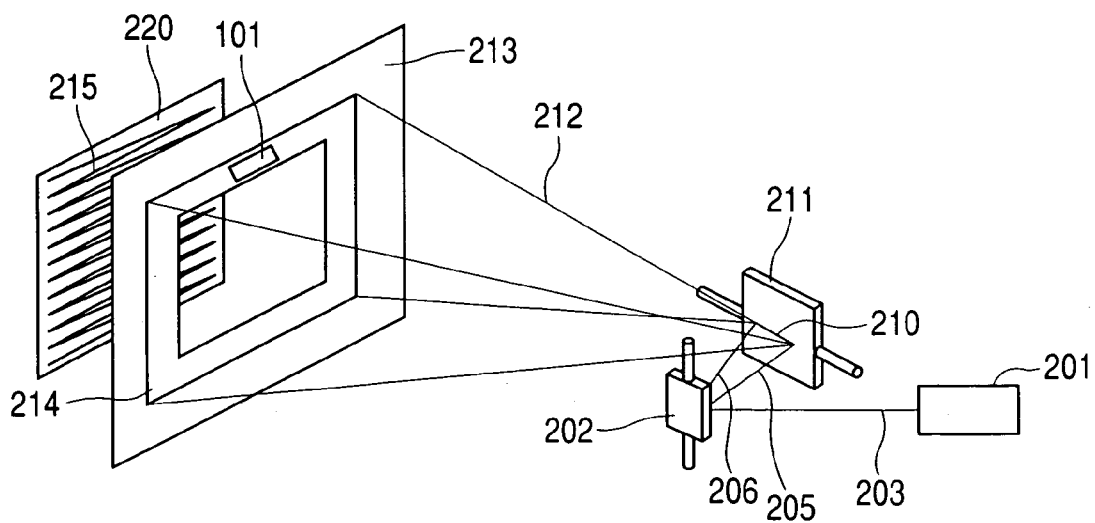
FIG. 16 is a schematic view showing an optical deflector according to an eighth embodiment of the present invention.

FIG. 16 is a schematic view showing an optical deflector according to this embodiment.

In FIG. 16, reference numeral 213 denotes a frame member, 214 denotes a scanning area in the case where the frame member is assumed to be a surface, 220 denotes the display region, and 215 denotes the scanning line trajectory on the display region 215.

The light receiving element 101 is placed on the frame member within the scanning area 214, so that a surface including the display region and a surface including the light receiving element can be separated from each other.

The distance L between the light receiving element 101 and the deflection means 202 and the distance between the position at which the light receiving element 101 is placed and the optical deflection center axis 206 can be set to a fixed value. Therefore, absolute precision of the deflection angle to be controlled can be improved.

According to the optical deflector in this embodiment, it is possible to provide an image forming apparatus capable of holding the scanning amplitude (deflection angle) to be controlled to an arbitrary value with high precision.

In this embodiment, when an optical deflector has a structure in which an observer can observe an image formed on the display region 220 at a position between the frame member and the image, the optical deflector of this embodiment can be applied to an image display apparatus such as a front-type projector.

According to this embodiment, the display region can be projected to an arbitrary surface, so that the display region can be arbitrarily selected. Therefore, such a projector can be used as an apparatus capable of selecting an arbitrary surface without providing a limitation on a project surface for image display.

When an observer can observe the image formed on the display region 220 from an opposite side of a display surface of the display region 220, the optical deflector according to this embodiment can be used for an image display apparatus such as a rear projector.

The optical deflector according to this embodiment can be applied to a retinal drawing-type display apparatus and an image display apparatus such as a head mount display.

In the optical deflector according to this embodiment, the frame member 213 is not an essential member. However, when the light receiving element 101 is fixed to the frame member 213, the light receiving element 101 can be positioned. Therefore, it is preferable to use the frame member 213.

It is preferable to use the frame member 213 for limiting the display region 220. Thus, the frame member 213 in which the light receiving element 101 is provided may be used as the constituent element of the optical deflector according to this embodiment.

EXAMPLE 1

In Example 1, the optical deflector according to this embodiment is used as a scanning means of an electrophotographic process image forming apparatus, which performs one-dimensional scanning and exposure light to a photosensitive member.

Figure 17A:
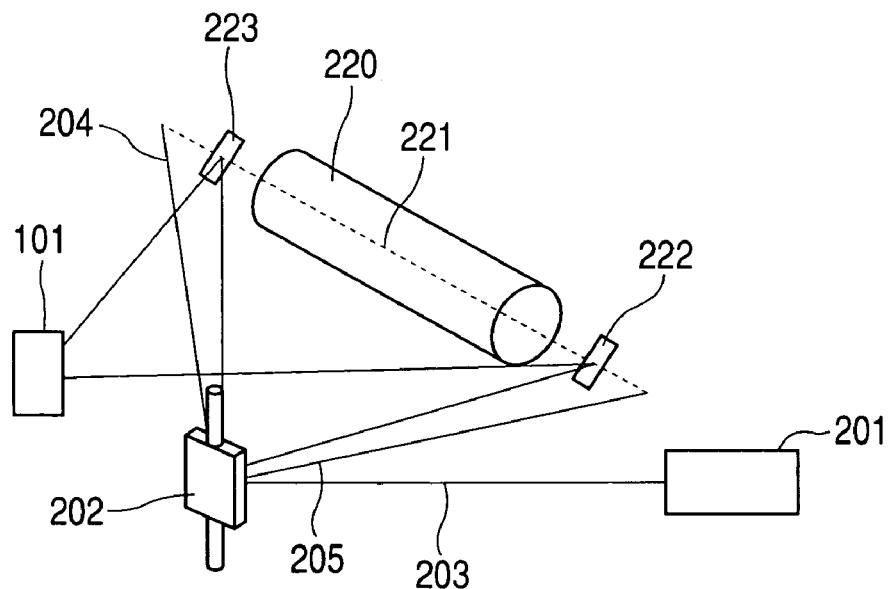
FIGS. 17A and 17B are explanatory views showing Example 1.
Figure 17B:
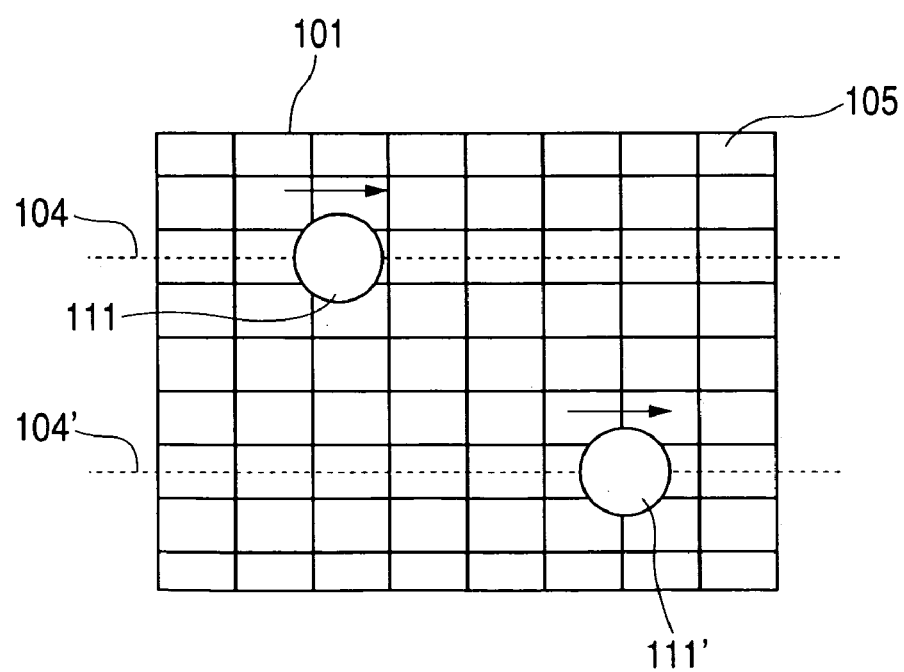

FIGS. 17A and 17B are explanatory views showing this example.

In FIG. 17A, reference numeral 220 denotes the photosensitive member, 221 denotes the axis including the scanning trajectory on the surface of the photosensitive member, and 222 and 223 each denote the reflection mirror.

The light beam 205 emitted from the light source 201 is deflected on the deflection means 202 for reciprocating scanning and moved on the axis 221 including the scanning trajectory. The ON signal of the modulation signal is generated one time during each of a period for which the deflected light beam moves on the reflection mirror 222 and a period for which the deflected light beam moves on the reflection mirror 223. The reflection mirrors, each of which reflects the light beam are located so as to generate the modulation spots on the receiving element 101.

FIG. 17B is a schematic view showing a positional relationship between the modulation spots on the light receiving element 101.

The deflection light beam reflected on the reflection mirror 222 generates the modulation spot 111. The deflection light beam reflected on the reflection mirror 223 generates the modulation spot 111'. The reflection mirrors 222 and 223 are located such that the deflection light beams generating the modulation spots move along the different scanning trajectories 104 and 104'.

In this example, an infrared semiconductor laser is used as the light source 201, a galvano-mirror is used as the deflection means 202, and a CCD area sensor is used as the light receiving element 101.

The galvano-mirror is driven with a saw-tooth drive waveform. Even when a drive cycle is changed between 30 Hz and 10 kHz, the scanning amplitude can be controlled with high precision by the present invention.

Because the CCD area sensor is used, a low noise detection signal can be obtained, with the result that it is possible to perform high precision detection.

As described above, when the optical deflector of the present invention is used in this example, it is possible to realize a one-dimensional scanning apparatus for displaying an image with high precision.

EXAMPLE 2

In Example 2, the optical deflector of the present invention is used as a scanning means of a projection-type image forming apparatus, which performs two-dimensional scanning.

Figure 18:
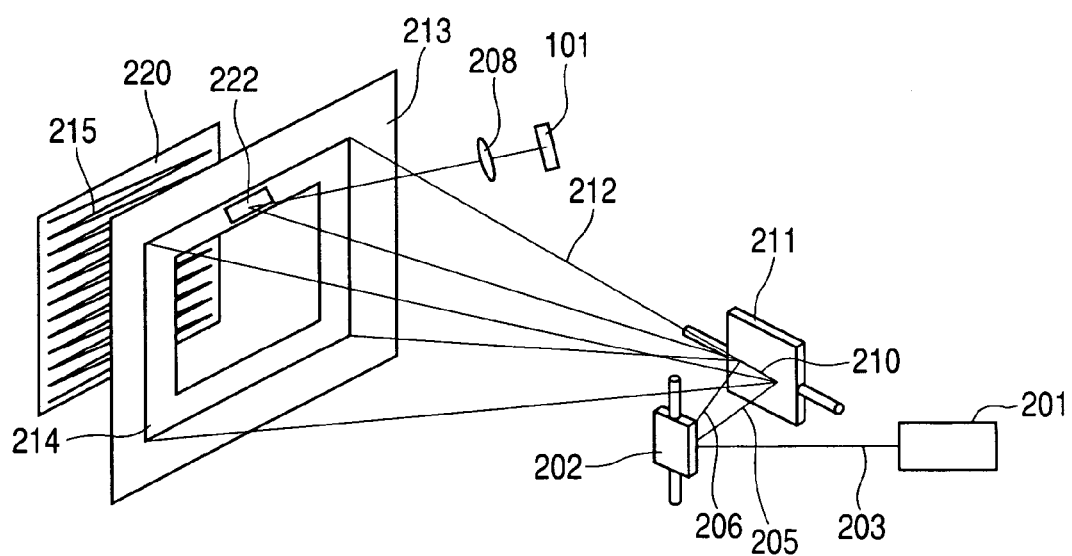
FIG. 18 is an explanatory view showing Example 2.

FIG. 18 is an explanatory view showing this example.

In FIG. 18, reference numeral 222 denotes the reflection mirror.

The light beam 205 emitted from the light source 201 is two-dimensionally deflected on the deflection means 202 and the second deflection means 211. The ON signal of the modulation signal is generated one time during a period for which the deflected light beam moves on the reflection mirror 222 located on the frame member 213. The reflection mirror which reflects the light beam is located so as to generate the modulation spot on the receiving element 101 through the lens 208 for condensing.

In this example, a red semiconductor laser is used as the light source 201, a resonance-type deflector is used as the deflection means 202, and a CMOS area sensor is used as the light receiving element 101.

The resonance-type deflector having the resonance frequency fc of about 28 kHz is used and driven with a rectangular waveform. The second deflection means is driven with a saw-tooth drive waveform at 60 Hz. Even when the maximal deflection angle is changed between 5 deg. and 80 deg., the scanning amplitude can be controlled with high precision.

According to this example, it is possible to control a scanning amplitude necessary to realize a laser scanning projector with high resolution.

Even when the resonance frequency fc and the drive frequency fd are significantly displaced from each other, the control can be performed so as to obtain a desirable scanning amplitude.

Because the resonance-type deflector can be controlled, it is possible to significantly reduce energy required for driving.

Because the semiconductor laser is used as the light source 201, the light source can be directly modulated. Therefore, it is possible to reduce a size of the light source 201.

Because the semiconductor laser is used as the light source 201, the modulation light beam having high directivity can be deflected, so that the modulation spot on the light receiving element 101 has a preferable shape. As a result, the scanning amplitude can be detected with high precision.

Because the light receiving element 101 is located on the frame member 213, the precision of a detectable absolute deflection angle is improved, so that a desirable scanning amplitude can be realized.

Because the CMOS area sensor is used as the light receiving element 101, it is possible to reduce the power consumption of the light receiving element 101.

Because the reflection mirror 222 and the lens 208 for condensing are used, the light receiving element 101 can be easily located, so that a size of the image display apparatus can be reduced.

As described above, when the optical deflector of the present invention is used as in this example, a two-dimensional scanning apparatus for displaying an image with high precision can be realized as an apparatus having a small size and low power consumption, that is, an apparatus suitable for a portable device.

This application claims priority from Japanese Patent Application No. 2003-416177 filed Dec. 15, 2003, which is hereby incorporated by reference herein.

What is claimed is:

1. An optical deflector apparatus comprising:
   a modulation signal generator for generating signals to modulate a light so as to turn on or turn off a light source;
   a deflector for deflecting the light by reflecting light from the light source at a movable reflection surface, the deflector being configured to be able to change a direction of the movable reflection surface;
   a light detector for outputting signals based on the received light, wherein at least three light-receiving regions are one-dimensionally or two-dimensionally arranged and the light deflected by the deflector is received;
   a driver for supplying to the deflector driving signals to change the direction of the movable reflection surface; and
   a controller for defining a maximum deflection angle of the light to be deflected, by supplying control signals to the driver based on the signals outputted from the light detector,
   wherein the light is modulated so as to turn on or turn off the light source to form at least two light spots at the at least three light receiving regions, and the maximum deflection angle is defined based on the signals obtained by receiving the two light spots.

2. The optical deflector apparatus according to claim 1, wherein the movable reflection surface is supported through a torsion bar and is formed at a movable portion which oscillates.

3. The optical deflector apparatus according to claim 1, wherein the light detector measures scanning speed of the deflected light.

4. The optical deflector apparatus according to claim 3, wherein the movable reflection surface is supported through a torsion bar and is formed at a movable portion which oscillates.

5. The optical deflector apparatus according to claim 1, wherein the controller controls the deflector such that a space between the two light spots is made constant.

6. The optical deflector apparatus according to claim 5, wherein the movable reflection surface is supported through a torsion bar and is formed at a movable portion which oscillates.

7. The optical deflector apparatus according to claim 1, wherein the deflector is a resonance type deflector, and the controller makes a resonance frequency fc and a drive frequency fd be equal to each other.

8. The optical deflector apparatus according to claim 7, wherein the movable reflection surface is supported trough a torsion bar and is formed at a movable portion which oscillates.

9. The optical deflector apparatus according to claim 1, further comprising another deflector for two-dimensionally projecting the deflected light on a surface to be projected.

10. The optical deflector apparatus according to claim 9, wherein the movable reflection surface is supported through a torsion bar and is formed at a movable portion which oscillates.

* * * * *

UNITED STATES PATENT AND TRADEMARK OFFICE
CERTIFICATE OF CORRECTION

| | | |
|---|---|---|
| PATENT NO. | : 7,149,017 B2 | Page 1 of 1 |
| APPLICATION NO. | : 11/000042 | |
| DATED | : December 12, 2006 | |
| INVENTOR(S) | : Atsushi Kandori et al. | |

It is certified that error appears in the above-identified patent and that said Letters Patent is hereby corrected as shown below:

COLUMN 7:
Line 4, "tuned" should read --turned--.
Line 32, "oscillation" should read --oscillations--.

COLUMN 22:
Line 39, "trough" should read --through--.

Signed and Sealed this

Nineteenth Day of June, 2007

JON W. DUDAS
*Director of the United States Patent and Trademark Office*